(12) United States Patent
Yagisawa

(10) Patent No.: US 9,876,636 B2
(45) Date of Patent: Jan. 23, 2018

(54) HOMOMORPHIC PUBLIC-KEY ENCRYPTION SCHEME

(71) Applicant: Empire Technology Development LLC, Wilmington, DE (US)

(72) Inventor: Masahiro Yagisawa, Yokohama (JP)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 182 days.

(21) Appl. No.: 14/990,028

(22) Filed: Jan. 7, 2016

(65) Prior Publication Data

US 2017/0201371 A1    Jul. 13, 2017

(51) Int. Cl.
| | |
|---|---|
| *H04L 29/06* | (2006.01) |
| *H04L 9/06* | (2006.01) |
| *H04L 9/08* | (2006.01) |
| *H04L 9/14* | (2006.01) |

(52) U.S. Cl.
CPC .......... *H04L 9/0618* (2013.01); *H04L 9/0822* (2013.01); *H04L 9/14* (2013.01); *H04L 2209/24* (2013.01)

(58) Field of Classification Search
CPC .................................................... H04L 9/0618
USPC ............................................................ 713/189
See application file for complete search history.

(56) References Cited

U.S. PATENT DOCUMENTS

| | | | |
|---|---|---|---|
| 8,515,058 B1 | 8/2013 | Gentry | |
| 2011/0110525 A1* | 5/2011 | Gentry | .................. H04L 9/0822 380/285 |
| 2013/0170640 A1 | 7/2013 | Gentry | |
| 2013/0216044 A1 | 8/2013 | Gentry et al. | |
| 2013/0329883 A1 | 12/2013 | Tamayo-Rios | |

(Continued)

FOREIGN PATENT DOCUMENTS

WO      2015130297 A1    9/2015

OTHER PUBLICATIONS

Agarwal, A., "Security Enhancement Scheme for Image Steganography using S-DES Technique," International Journal of Advanced Research in Computer Science and Software Engineering vol. 2, Issue 4, pp. 164-169, (Apr. 2012).

(Continued)

*Primary Examiner* — Longbit Chai
(74) *Attorney, Agent, or Firm* — Brundidge & Stanger, P.C.

(57) ABSTRACT

Technologies are generally described for providing a fully homomorphic public key encryption scheme. In some examples, a method performed under control of a transmitter may include receiving, from a server, a system parameter; selecting a secret decryption key corresponding to the transmitter; generating a first public encryption key for the transmitter, based at least in part on the secret decryption key corresponding to the transmitter and the system parameter; receiving, from the server, a public encryption key corresponding to a receiver; enciphering a message into a first ciphertext, based at least in part on the public encryption key corresponding to the receiver and the secret decryption key corresponding to the transmitter; and transmitting, to a data processing device, a request to process the message by processing the first ciphertext that corresponds to the message into a second ciphertext without deciphering the first ciphertext.

20 Claims, 12 Drawing Sheets

(56) References Cited

U.S. PATENT DOCUMENTS

2013/0339722 A1  12/2013  Krendelev et al.
2014/0177828 A1   6/2014  Loftus et al.

OTHER PUBLICATIONS

Bardet, M., et al., "On the complexity of Gröbner basis computation of semi-regular overdetermined algebraic equations," Proceeding of the International Conference on Polynomial System Solving(ICPSS2004), pp. 1-4 (2004).
Boneh, D., and Freeman, D.M., "Homomorphic Signatures for Polynomial Functions," Advances in Cryptology—EUROCRYPT 2011, Lecture Notes in Computer Science, vol. 6632, pp. 149-168 (Apr. 2011).
Catalano, D. et al., "Homomorphic signatures with efficient verification for polynomial functions," Lecture Notes in Computer Science, vol. 8616, pp. 371-389 (Jun. 2014).
"Cohen's cryptosystem," accessed at https://web.archive.org/web/20150529154543/http://en.wikipedia.org/wiki/Cohen's_cryptosystem, last modified on Mar. 12, 2015, pp. 3.
Cooney, M., "IBM touts encryption innovation," accessed at http://www.computerworld.com/article/2526031/security0/ibm-touts-encryption-innovation.html, Jun. 25, 2009, pp. 1-2.
Dijk, M. et al., "Fully Homomorphic Encryption over the Integers," vol. 6110, pp. 24-43 (Jun. 2010).
Gentry, C., "Fully Homomorphic Encryption Using Ideal Lattices," Proceedings of the forty-first annual ACM symposium on Theory of computing, pp. 169-178 (May 2009).
Gentry, C., "Computing Arbitrary Functions of Encrypted Data," Communications for ACM, vol. 53, Issue 3, pp. 97-105 (Mar. 1, 2010).
Gentry, C., "A Fully Homomorphic Encryption Scheme," accessed at https://web.archive.org/web/20150413214934/http://crypto.stanford.edu/craig/craig-thesis.pdf, Sep. 2009, 209 Pages.
Gupta, S. et al., "Information Hiding Using Least Significant Bit Steganography and Cryptography," I. J. Modern Education and Computer Science, vol. 6, pp. 27-34 (Jun. 4, 2012).
Gorbunov, S. et al., "Leveled Fully Homomorphic Signatures from Standard Lattices," pp. 1-39 (Oct. 22, 2014).
"IBM Researcher Solves Longstanding Cryptographic Challenge," accessed at https://web.archive.org/web/20140225162739/http://www-03.ibm/press/us/en/pressrelease/27840.wss, Jun. 25, 2009, 1 Page.
Matsumoto, T., and Imai, H., "Public Quadratic Polynomial-Tuples for Efficient Signature-Verification and Message-Encryption," Advances in Cryptology—EUROCRYPT '88 Lecture Notes in Computer Science, vol. 330, pp. 419-453 (1998).
M, H. K. and Vijaya, P.A., "Secure data hiding algorithm using encrypted secret message," International Journal of Scientific and Research Publications, vol. 2, Issue 6, pp. 1-4, Jun. 2012.
Nath, J. and Nath, A., "Advanced Steganography Algorithm using Encrypted secret message," International Journal of Advanced Computer Science and Applications, vol. 2, No. 3, pp. 19-24, (Mar. 2011).
Nuida, K. and Kurosawa, K., "(Batch) Fully Homomorphic Encryption over Integers for Non-Binary Message Spaces," Advance of Cryptology, vol. 9056, pp. 537-555, 2015.
P. J. et al., "Information hiding using audio stegnography—A Survey," The International Journal of Multimedia & its Applications (IJMA), vol. 3, No. 3, pp. 86-96, (Aug. 2011).
Parakh, A., "Privacy Preserving Computations Using Implicit Security," 22nd International Conference on Computer Communications and Networks, 1 page Jul. 2013.
Rivest, R., et al., "On data banks and privacy homomorphisms," In Foundations of Secure Computation, pp. 160-179 (1978).
Sarmah, D.K. and Bajpai, N., "Proposed System for data hiding using Cryptography and Steganography," International Journal of computer applications, pp. 1-8 (Oct. 2010).
Smart, N. and Vercauteren, F., "Fully Homomorphic Encryption with Relatively Small Key and Ciphertext Sizes," vol. 6056, pp. 420-443 (2010).
Singh, G. et al., "Superiority of Blowfish Algorithm in Wireless Networks," International Journal of Computer Applications, vol. 44, No. 11, pp. 23-26 (Apr. 2012).
Stehle, D. and Steinfeld, R., "Faster Fully Homomorphic Encryption," vol. 6477, pp. 377-394 (2010).
Tsujii, S., et al., "Piece in Hand Concept for Enhancing the Security of Multivariate Type Public Key Cryptosystems: Public Key Without Containing All the Information of Secret Key," Cryptology ePrint Archive, Report 2004/366, pp. 1-32 (2004).
Tsuiji, S. et al., "Proposal Integrated MPKC:PPS-STS Enhanced Perturbed Piece in Hand Method," IEICE Tech. Rep. ISEC2009-27, vol. 109, Issue No. 113, pp. 139-146 (Jul. 25, 2009) (English Abstract).
Tetali, S. D. et al., "MrCrypt: static analysis for secure cloud computations," Proceedings of the 2013 ACM SIGPLAN International conference on Object oriented programming systems languages & applications, vol. 48, Issue 10, pp. 271-286 (Oct. 2013).
Tyagi, V., "Data Hiding in Image using least significant bit with cryptography," in International Journal of Advanced Research in Computer Science and Software Engineering, vol. 2, Issue 4, pp. 120-123 (Apr. 2012).
Vennice, M. et al., "Hiding the Text Information using Stegnography," International Journal of Engineering Research and Applications (IJERA), vol. 2, Issue 1, pp. 126-131 (Jan.-Feb. 2012).
Vitthal, P. S. et al., "A Novel Security Scheme for Secret Data using Cryptography and Steganography," International Journal of Computer Network and Information Security Information, vol. 4, No. 2, pp. 36-42 (Mar. 2012).
Wolf, C., and , B., "Taxonomy of public key schemes based on the problem of multivariatequadratic equations," Cryptology ePrint Archive, Report 2005/077, pp. 1-64 (2005).
Wolf, A.L., "Association for Computing Machinery," accessed at https://web.archive.org/web/20150608100031/http://en.wikipedia.org/wiki/Association_for_Computing_Machinery, last modified on May 31, 2015, 10 Pages.
Yagisawa, M. et al., "Key distribution system and attribute-based encryption on non-commutative ring," pp. 1-9, 2012.
Extended European Search Report for European Application No. EP 16199559.2 dated May 12, 2017, pp. 10.
Yagisawa, M., "Fully Homomorphic Encryption on Octonion Ring," International Association for Cryptologic Research, XP061018931, pp. 1-42 (Jul. 22, 2015).

* cited by examiner

HOMOMORPHIC PUBLIC-KEY ENCRYPTION SCHEME

BACKGROUND

A homomorphic encryption scheme may enable arbitrary functions to be performed on encrypted data without requiring the use of a decryption key.

SUMMARY

In an example, a method performed under control of a transmitter may include: receiving, from a server, a system parameter; selecting a secret decryption key corresponding to the transmitter; generating a first public encryption key for the transmitter, based at least in part on the secret decryption key corresponding to the transmitter and the system parameter; receiving, from the server, a public encryption key corresponding to a receiver; enciphering a message into a first ciphertext, based at least in part on the public encryption key corresponding to the receiver and the secret decryption key corresponding to the transmitter; and transmitting, to a data processing device, a request to process the message by processing the first ciphertext that corresponds to the message into a second ciphertext without deciphering the first ciphertext.

In another example, a method performed under control of a receiver may include: receiving, from a server, a system parameter; selecting a secret decryption key corresponding to the receiver; generating a public encryption key for the receiver, based at least in part on the secret decryption key corresponding to the receiver and the system parameter; receiving, from a transmitter, a first ciphertext; receiving, from the server, a public encryption key corresponding to the transmitter; and deciphering the first ciphertext based at least in part on the secret decryption key of the receiver, the system parameter and the public encryption key corresponding to the transmitter.

In yet another example, a method performed under control of a data processing device may include: receiving, from a transmitter, a request to process a message; receiving, from a server, a system parameter and a first ciphertext that corresponds to the message, based at least in part on the received request; processing the first ciphertext to a second ciphertext by calculating the first ciphertext, based at least in part on the received request, without deciphering the first ciphertext; and transmitting, to the transmitter, the second ciphertext.

In yet another example, a method performed under control of an endorser may include: receiving, from a server, a signing parameter; selecting a secret key of the endorser; generating a public signing key of the endorser, based at least in part on the secret key corresponding to the endorser and the signing parameter; calculating a signature corresponding to a message, based at least in part on the public signing key corresponding to the endorser and the signing parameter; and transmitting, to the server, the signature and the public signing key.

In yet another example, a transmitter may include: a receiving unit configured to receive, from a server, a system parameter and a public encryption key of a receiver; a key manager configured to select a secret decryption key of the transmitter and to generate a first public encryption key for the transmitter, based at least in part on the secret decryption key corresponding to the transmitter and the system parameter; an encipherer configured to encipher a message into a first ciphertext, based at least in part on the public encryption key corresponding to the receiver and the secret decryption key corresponding to the transmitter; and a transmitting unit configured to transmit, to a data processing device, a request to process the message by processing the first ciphertext that corresponds to the message into a second ciphertext without deciphering the first ciphertext.

In yet another example, a receiver may include: a receiving unit configured to: receive, from a server, a system parameter and a public encryption key of a receiver, and receive, from a transmitter, a first ciphertext; a key manager configured to select a secret decryption key of the receiver and generate a public encryption key for the receiver, based at least in part on the secret decryption key of the receiver and the system parameter; and a decipherer configured to decipher the first ciphertext based at least in part on the secret decryption key of the receiver, the system parameter and the public encryption key corresponding to the transmitter.

In yet another example, a data processing device may include: a receiving unit configured to: receive, from a transmitter, a request to process a message, and receive, from a server, a system parameter and a first ciphertext that corresponds to the message, based at least in part on the received request; a processor configured to process the first ciphertext into a second ciphertext by calculating the first ciphertext, based at least in part on the received request, without deciphering the first ciphertext; and a transmitting unit configured to transmit, to the transmitter, the second ciphertext.

In yet another example, an endorser may include: a receiving unit configured to receive, from a server, a signing parameter; a key manager configured to select a secret key corresponding to the endorser, and generate a public signing key for the endorser, based at least in part on the secret key corresponding to the endorser and the signing parameter; a signature generator configured to calculate a signature corresponding to a message, based at least in part on the public signing key corresponding to the endorser and the signing parameter; and a transmitting unit configured to transmit, to the server, the signature and the public signing key.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
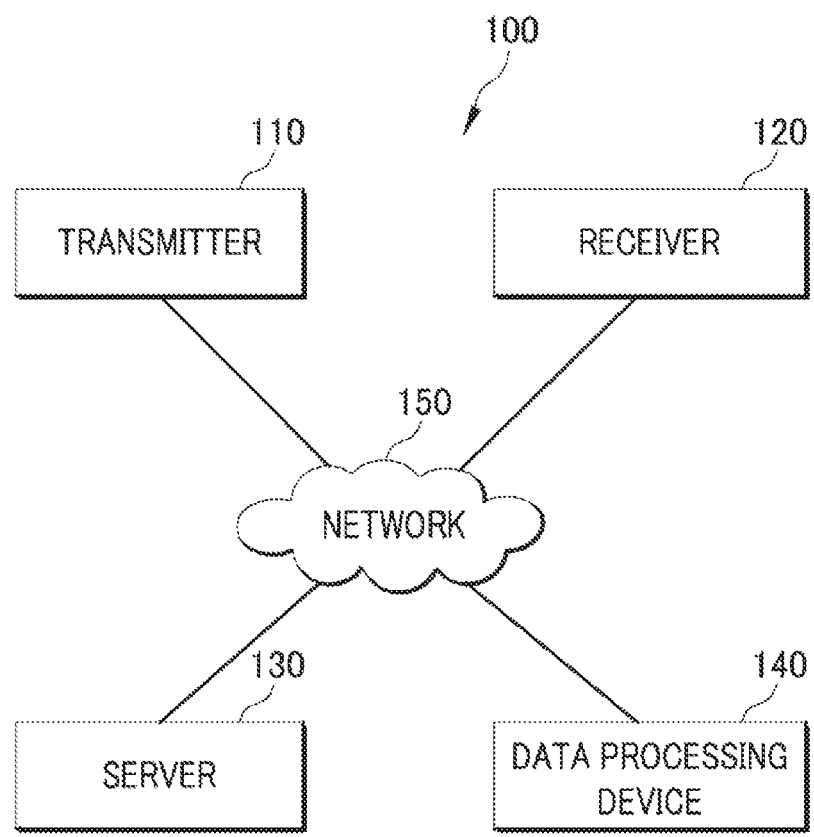
FIG. 1 shows an illustrative example of a homomorphic public key encryption system, arranged in accordance with at least some embodiments described herein.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatuses, systems, devices, and computer program products related to a homomorphic public key encryption scheme. A homomorphic public-key encryption scheme may refer to an encryption scheme that enables certain types of computations to be carried out on an encrypted message, i.e., a ciphertext, without having to decrypt the message. Accordingly, an encrypted result that matches the result of computations performed on the message is obtained. Thus, technologies are generally described for executing computations and/or operations on encrypted data without decrypting the encrypted data.

In some embodiments, a transmitter may be configured to generate a first public encryption key for the transmitter, based at least in part on a secret decryption key corresponding to the transmitter and a system parameter. The system parameter may be a prime number q greater than 2, or an element in an octonion ring over a finite field. The transmitter may be further configured to encipher a message into a first ciphertext, based at least in part on a public encryption key corresponding to a receiver of the message and the secret decryption key corresponding to the transmitter.

Further, the transmitter may be configured to transmit, to a data processing device, a request to process the message by processing the first ciphertext that corresponds to the message into a second ciphertext without deciphering the first ciphertext. For example, the request may include information regarding a type of message processing (e.g., calculation such as addition, subtraction, multiplication or division). When the data processing device receives the request from the transmitter, the data processing device may be configured to receive, from a server, the system parameter and a first ciphertext that corresponds to the message, based at least in part on the received request. Further, the data processing device may be configured to process the first ciphertext to a second ciphertext by calculating the first ciphertext, based at least in part on the received request, without deciphering the first ciphertext. Further, the data processing device may be configured to transmit the generated second ciphertext to the receiver. Thus, the receiver may be configured to receive, from the data processing device, the encrypted result of the calculation associated with the requested message. Further, the receiver may be configured to decipher the first ciphertext based at least in part on the secret decryption key of the receiver, the system parameter and the public encryption key corresponding to the transmitter. The receiver may be configured to then obtain a decrypted process result that may be equal to a result of the calculation on the requested message. Thus, the receiver may be configured to obtain a process result of encrypted data without revealing original data to other third parties, based on the fully homomorphic public key encryption scheme.

FIG. 1 shows an illustrative example of a homomorphic public key encryption system 100, arranged in accordance with at least some embodiments described herein. As illustrated in FIG. 1, homomorphic public key encryption system 100 may include a transmitter 110, a receiver 120, a server 130 and a data processing device 140, which may be connected to each other via a network 150.

Network 150 may be configured to communicatively couple two or more of transmitter 110, receiver 120, server 130 and data processing device 140. Non-limiting examples of network 150 may include a wired network such as a LAN (Local Area Network), a WAN (Wide Area Network), a VAN (Value Added Network) or the like, or various other wireless networks such as a mobile radio communication network including at least one of a 3rd generation (3G) mobile telecommunications network, a 4th or 5th generation mobile telecommunications network, various other mobile telecommunications networks, a satellite network, WiBro (Wireless Broadband Internet), Mobile WiMAX, HSDPA (High Speed Downlink Packet Access), or the like. Alternatively, network 150 may refer to at least one of various short-range communication protocols, such as a near field communication (NFC), Bluetooth, a radio frequency identification (RFID), a wireless body area network (WBAN), a wireless personal area network (WPAN) or a wireless local area network, a vehicle area network or a wireless sensor network that facilitates communication between one or more of transmitter 110, receiver 120, server 130, and data processing device 140.

For example, but not as a limitation, one or more of transmitter 110 or receiver 120 may be at least one of a smart phone, a portable device, a notebook computer, a tablet device, a phablet device, a personal computer or a personal communication terminal, such as PCS (Personal Communication System), GMS (Global System for Mobile communications), PDC (Personal Digital Cellular), PDA (Personal Digital Assistant). Transmitter 110 and receiver 120 may be capable of full duplex radio communications.

Further, in some embodiments, server 130 and/or data processing device 140 may include a cloud datacenter. For example, the could data center may be configured to store and/or manage cloud-based resources such as one or more servers for storing, retrieving and/or processing private data including, but not limited to, financial documents, tax records, voting data, electronic-mail messages, social network service-based messages, etc., or any other data for which a high level of privacy is expected.

In some embodiments, server 130 may select a published system parameter. As used herein, the term "system parameter" may refer to one or more parameters that may be predetermined by server 130 and may be shared with user devices such as transmitter 110, receiver 120 or data processing device 140. The system parameter may be used for any calculation or processes performed by the homomorphic public-key encryption system as disclosed herein. The system parameter may include at least one of a prime number (e.g., represented by "q") which is greater than 2, or an element (e.g., represented by "B"=($b_0$, . . . , $b_7$)" in a non-associative octonion ring (e.g., represented by "O") over a finite field such that $|B|^2=0$ mod q, B≠0 mod q and $b_0$≠0 mod q. As disclosed herein, the term "octonion ring" or "octonions" may refer to octets (or 8-tuples) of real numbers or a normed division algebra over such real numbers. As known in the art, an octonion ring is non-commutative and non-associative.

In some embodiments, transmitter 110 may be a data storage device configured to generate one or more ciphertexts by enciphering (or encrypting) stored data or messages that are received at and/or stored by transmitter 110. Transmitter 110 may be further configured to send the one or more generated ciphertexts to receiver 120 through network 150, via a connection that may or may not be secure. Additionally or alternatively, transmitter 110 may be further configured to send the one or more generated ciphertexts to data processing device 140 through network 150, via a connection that may or may not be secure, such that data processing device 140 may process the ciphertexts without revealing or otherwise deciphering the contents of the ciphertexts. In some other embodiments, transmitter 110 may be further configured to send the one or more generated ciphertexts to receiver 120 through network 150, via a connection that may or may not be secure, such that receiver 120 may process the ciphertexts without revealing or otherwise deciphering the contents of the ciphertexts. Then, transmitter 110 may be further configured to receive the results of processing the ciphertexts from data processing device 140 (or receiver 120) and decipher the received results.

In some embodiments, to receive one or more generated ciphertexts from transmitter 110, receiver 120 may be configured to receive the system parameter from server 130 via network 150, select a secret decryption key of receiver 120 from an arbitrary element of the octonion ring "O" that is included in the system parameter, and generate a public encryption key for receiver 120 based at least in part on the secret decryption key of receiver 120 and the system parameter. For example, the secret decryption key may be represented by "$sk_A = A = (A_1, \ldots, A_k) \in O^k$", and may be selected from an arbitrary element of the octonion ring "O" such that an inverse "$A^{-1}:=(A_1^{-1}, \ldots, A_k^{-1}) \in O_q^k$" of the secret decryption key may exist. That is, the existence of the inverse of the secret decryption key is needed to define a public encryption key of receiver 120, as described in more detail below. For example, an inverse of octonion A=($a_0$, $a_1$, . . . , $a_7$) exists if $|A|^2 \neq 0$ mod q, and the inverse of A can be calculated by using an algorithm Octinv(A) as follows: $A^{-1}=(a_0 S^{-1}$ mod q, $-a_1 S^{-1}$ mod q, . . . , $-a_7 S^{-1}$ mod q)←Octinv(A) where $S=a_0^2+a_1^2+ \ldots +a_7^2$ mod q. The algorithm Octinv(A) may be performed in the following manner

[Algorithm 1]

```
S ← a_0^2+a_1^2+...+a_7^2 mod q.
% S^-1 mod q
    q[1] ← q div S ;% integer part of q/S
    r[1] ← q mod S ;% residue
    k ←1
    q[0] ← q
    r[0] ← S
    while r[k] ≠ 0
        begin
            k← k + 1
            q[k] ← r[k-2] div r[k-1]
            r[k] ← r[k-2] mod [rk-1]
        end
    Q [k-1] ← (-1)*q[k-1]
    L[ k-1] ← 1
    i ← k-1
    while i > 1
        begin
            Q[ i-1] ← (-1)*Q[ i] *q[i-1] + L[ i]
            L[ i-1 ] ← Q[ i ]
            i← i-1
        end
    invS ← Q[1] mod q
    invA[0] ← a_0*invS mod q
    For i=1,...,7,
        invA[i] ← (-1)*a_i*invS mod q
    Return A^-1 = (invA[0], invA[1],..., invA[7])
```

Further, the secret decryption key may be engaged (or represented) in the octonion ring "O". Let $X=(x_0, \ldots, x_7) \in O[X]$ and $Y=(y_0, \ldots, y_7) \in O[Y]$ be variables selected from the octonion ring "O." The public encryption key (or public enciphering function) A(X,Y) of receiver 120 may be defined using the variables X and Y and the secret decryption key A and its inverse, as follows:

$$A(X, Y) = \quad \text{[Formula 1]}$$

$$A_k( \ldots (A_1(Y(A_1^{-1}( \ldots (A_k^{-1}X) \ldots )\mod q \in O[X, Y] =$$

$$(a_{000}x_0 y_0 + a_{001}x_0 y_1 + \ldots + a_{007}x_0 y_7 +$$

$$\ldots + a_{070}x_7 y_0 + a_{071}x_7 y_1 +$$

$$\ldots + a_{077}x_7 y_7, \ldots \ldots \ldots a_{700}x_0 y_0 +$$

$$a_{701}x_0 y_1 + \ldots + a_{707}x_0 y_7 + \ldots +$$

$$a_{770}x_7 y_0 + a_{771}x_7 y_1 + \ldots + a_{777}x_7 y_7)$$

Further, server 130 may publish $pk_A = M_A = \{a_{ijk}\} \in Z_q^{8 \times 64}$ as the public encryption key of receiver 120.

In some embodiments, to encipher a message that transmitter 110 receives and/or stores, transmitter 110 may be configured to receive the system parameter from server 130, select a secret decryption key of transmitter 110, and generate a first public encryption key for transmitter 110, based at least in part on the secret decryption key corresponding to transmitter 110 and the system parameter. For example, transmitter 110 may select the secret decryption key $sk_Z=Z=(Z_1, \ldots, Z_k)\in O^k$ from an arbitrary element of the octonion ring "O" such that the inverse $Z^{-1}:=(Z_1^{-1}, \ldots, Z_k^{-1})\in O_q^k$ may exist. That is, the existence of the inverse of the secret decryption key is needed to define a public encryption key of transmitter 110, as described in more detail below. For example, an inverse of octonion $Z=(z_0, z_2, \ldots, z_7)$ exists if $|Z|^2 \neq 0 \mod q$, and the inverse of Z can be calculated by using algorithm Octinv(Z) (see Algorithm 1 above) such that $Z^{-1}=(a_0 S^{-1} \mod q, -a_1 S^{-1} \mod q, \ldots, -a_7 S^{-1} \mod q)\leftarrow \text{Oct-inv}(Z)$ where $S=a_0^2+a_1^2+\ldots+a_7^2 \mod q$. The first public encryption key for transmitter 110 may be represented as "Z(X,Y)" which may be defined using the variables X and Y and the secret decryption key Z and its inverse, as follows:

[Formula 2]
$$Z(X, Y) = Z_k(\ldots (Z_1(Y(Z_1^{-1}(\ldots (Z_k^{-1} X) \ldots )\bmod q \in O[X] =$$
$$(z_{000}x_0y_0 + z_{001}x_0y_1 + \ldots + z_{007}x_0y_7 +$$
$$\ldots + z_{070}x_7y_0 + z_{071}x_7y_1 + \ldots +$$
$$z_{077}x_7y_7, \ldots \ldots \ldots z_{700}x_0y_0 +$$
$$z_{701}x_0y_1 + \ldots + z_{707}x_0y_7 + \ldots +$$
$$z_{770}x_7y_0 + z_{771}x_7y_1 + \ldots + z_{777}x_7y_7)$$

Further, server 130 may publish $pk_Z = M_Z = \{z_{ijk}\} \in Z_q^{8 \times 64}$ as the first public encryption key of transmitter 110.

In some embodiments, transmitter 110 may be further configured to receive, from server 130, the public encryption key (e.g., "$pk_A = M_A = \{a_{ijk}\}$") of receiver 120, via network 150. Further, transmitter 110 may be configured to encipher a message into a first ciphertext, based at least in part on the public encryption key corresponding to receiver 120 and the secret decryption key corresponding to transmitter 110. In one embodiment, the message may include multiple message elements that may be represented in a non-associative octonion ring. For example, the message may be represented by "$m_h \in Fq$ (h=1, ..., t)." Further, the first ciphertext may include multiple first ciphertext elements that may be represented in a non-associative octonion ring. For example, let $v_h \in Fq$ (h=1, ..., t) be a random number, $U_h=(u_{h0}, \ldots, u_{h7})=m_h1+v_h B\in O$ (h=1, ..., t) be medium texts, and $(m_h,v_h):=m_h1+v_h B\in O$.

For example, the first ciphertext may be represented by "$C(pk_A, sk_Z; X, (m_h, v_h))$ (h=1, ..., t)." That is, the first ciphertext may be a function of the public encryption key corresponding to receiver 120, the secret decryption key corresponding to transmitter 110, the variable X and the message to be encipher. The first ciphertext may be calculated by using an algorithm $Enc(pk_A, sk_Z, (m,v))$ as follows:

As a result, the calculated first ciphertext may be represented as follows.

[Formula 3]
$$C(pk_A, sk_Z; X, (m_h, V_h)) = (C_{h00}X_0 + C_{h01}X_1 + \ldots +$$
$$C_{h07}X_7, \ldots \ldots \ldots C_{h70}X_0 + C_{h71}X_1 + \ldots + C_{h77}X_7)$$

In some embodiments, transmitter 110 may be configured to transmit the first ciphertext to receiver 120. For example, transmitter 110 may transmit $\{c_{hq}\}$ (h=1, ..., t) (i.e., coefficients for the variable X in Formula 3) as the first ciphertext to receiver 120. Also, transmitter 110 (or its user) may attempt to send an encrypted message, such as the first ciphertext, to receiver 120 through network 150, which may or may not be secure, without revealing contents of the message. Accordingly, to decipher the first ciphertext, receiver 120 may be configured to receive, from server 130, the public encryption key (e.g., $pk_Z = M_Z = (z_{ijk})$) corresponding to transmitter 110. Receiver 120 may be further configured to decipher the first ciphertext based at least in part on the secret decryption key of receiver 120, the system parameter and the public encryption key corresponding to transmitter 110. For example, receiver 120 may decipher a message $m_h$ (h=1, ..., t) from the ciphertext $\{c_{hii}\}$ (h=1, ..., t) using an algorithm $Dec(sk_A, B, pk_Z, C(pk_A, sk_Z; X, (m,v)))$ as follows.

[Algorithm 3]
```
K_A ← A_k(...(A_2 A_1)...) mod q
D=(d_0,...,d_7)←A_1^-1(...(A_k^-1(C(pk_A,sk_z; K_A, (m,v)))...) mod q
U'=(u_0',...,u_7')←GaussElimi(pk_z,D)
v ← u_2'/b_1 mod q
m ←u_0'-vb_0= u_0'-(u_1'/b_1)b_0 mod q
Return (m,v)
``` where the algorithm $GaussElimi(pk_Z, O)$ may be defined as follows:

[Algorithm 4]
```
% Forward Elimination
  For i=0,...,7,
    For j=0,...,7,
      z[i][0][j] ←z_i0j
    For i=0,...,7,
      t ← z[i][0][i]
      For j=i+1,...,7,
        p←z[j] [0] [i]/t mod q
        z[j] [0] [i] ←0
        For k=j+1,...,7,
          z[j] [0] [k] -= p*z[i] [0] [k] mod q
        d[j] -= p*d[i] mod q
%Back Substitution
  u[7] = d[7]/z[7] [0] [7] mod q
  For i=6,...,0
```

[Algorithm 2]
```
C_1(X) ← A(A(X,Z_{k-1}),Z_k)=A_k(...(A_s(Z_k(Z_{k-1}(A_1^-1(...(A_k^-1 X)...) mod q
For i=2,...,k-1,
    C_i(X) ← C_{i-1}(A(X,Z_{k-i})) = A_k(...(A_1(Z_k(...(Z_{k-1}(A_1^-1(...(A_k^-1 X)...) mod q
U ← m1+v8 mod q
C_k(X) ← C_{k-1}(A(X,U))= A_k(...(A_1(Z_k(Z_{k-1}(...(Z_1(U(A_1^-1(...(A_k^-1 X)...))...) mod q
For i=k+1,...,k+k,
    C_i(X) ← C_{i-k}(A(X,Z_k^-1))= A_k(...(A_1(Z_k(...(Z_1(U(Z_1^-1(...(Z_{i-k}^-1(A_1^-1(...(A_k^-1 X)...))...) mod q
C(pk_A,sk_z;X,(m,v)) ←C_{i-k}(X)= A_k(...(A_1(Z_i(Z_{k-1}(...(Z_1(U(Z_1^-1(...(Z_k^-1(A_1^-1(...(A_k^-1 X)...))...) mod q
Return C(pk_A,sk_z;X,(m,v))
```

```
u[i] ← d[i]
  For j=i+1,...,7
    u[i] -= z[i] [0] [j]*n[j] mod q
  u[i] /= z[i] [0] [i] mod q
For i=0,...,7
  u_i←u[i]
Return (u_0,u_1,...,u_7)
```

Further, to request data processing device 140 to process the first ciphertext without deciphering the first ciphertext, transmitter 110 may select a temporary secret decryption key. For example, transmitter 110 may select a temporary secret decryption key $R=(R_1, \ldots, R_k) \in O^k$ such that the inverse $R_i^{-1}$ ($i=1, \ldots, k$) exists. For example, an inverse of octonion $R=(r_0, r_2, \ldots, r_7)$ exists if $|R|^2 \neq 0$ mod q, and the inverse of R can be calculated by using Octinv(R) (see Algorithm 1 above) such that $R^{-1}=(r_0 S^{-1}$ mod q, $-r_1 S^{-1}$ mod q, $\ldots, -r_7 S^{-1}$ mod q)←Octinv(R) where $S=r_0^2+r_1^2+\ldots+r_7^2$ mod q. Further, transmitter 110 may be configured to generate a temporary public encryption key for transmitter 110, based at least in part on the temporary secret decryption key corresponding to transmitter 110 and the system parameter. For example, transmitter 110 may generate a temporary public encryption key R(X, Y) using the variables X and Y and the temporary secret decryption key R and its inverse, as $R(X,Y):=R_k(\ldots (R_1(Y(R_1^{-1}(\ldots (R_k^{-1}X) \ldots))$ mod $q \in O[X,Y]$. Further, transmitter 110 may be configured to generate a second public encryption key for transmitter 110, based at least in part on the first public encryption key and the temporary secret decryption key corresponding to transmitter 110 and the system parameter. For example, transmitter 110 may generate a second public encryption key $C2(pk_A, sk_R; X, Y)$ as follows:

[Formula 4]

$$C2(pk_A, sk_R; X, Y) := \\ A_k(\ldots (A_1(R_k(\ldots (R_1(Y(R_1^{-1}(\ldots (R_k^{-1}(A_1^{-1}(\ldots (A_k^{-1}X) \ldots)) \\ \ldots) \bmod q \in O[X, Y] = \\ (r_{000}x_0y_0 + r_{001}x_0y_1 + \ldots + \\ r_{007}x_0y_7 + \ldots + r_{070}x_7y_0 + r_{071}x_7y_1 + \ldots + \\ r_{077}x_7y_7, \ldots \ldots \ldots r_{700}x_0y_0 + r_{701}x_0y_1 + \\ \ldots + r_{707}x_0y_7 + \ldots + r_{770}x_7y_0 + \\ r_{771}x_7y_1 + \ldots + r_{777}x_7y_7)$$

In this case, transmitter 110 may be configured to encipher the message into the first ciphertext further based on the temporary secret decryption key corresponding to the transmitter. For example, transmitter 110 may encipher a message $U_h=m_h 1+v_h B$ ($h=1, \ldots, t$) into the first ciphertext. That is, the first ciphertext may be a function of the public encryption key corresponding to transmitter 110, the temporary secret decryption key corresponding to transmitter 110, the variable X and the message to be enciphered. The first ciphertext may be calculated using an algorithm $Enc(pk_A, sk_R, (m, v))$. As a result, the calculated first ciphertext may be represented as follows

[Formula 5]

$$C2(pk_A, sk_R; X, (m_h, v_h)) = \\ A_k(\ldots (A_1(R_k(\ldots (R_1(U_h(R_1^{-1}(\ldots (R_k^{-1}(A_1^{-1}(\ldots (A_k^{-1}X) \ldots))) \\ \ldots) \in O[X] = (C_{h00}X_0 + C_{h01}X_1 + \\ \ldots + C_{h07}X_7, \ldots \ldots \ldots C_{h70}X_0 + \\ C_{h71}X_1 + \ldots + C_{h77}X_7)$$

Transmitter 110 may be configured to send the first ciphertext to server 130, which may publish the first ciphertext. For example, transmitter 110 may transmit $\{c_{hij}\}$ ($h=1, \ldots, t$) (i.e., coefficients for the variable X in Formula 5) as the first ciphertext to server 130.

In some embodiments, transmitter 110 may be configured to transmit, to data processing device 140, a request to process the message by processing the first ciphertext, which corresponds to the message enciphered by transmitter 110, into a second ciphertext without deciphering the first ciphertext. For example, transmitter 110 may request a value of a ciphertext of $m^*=(m_1+m_2-m_3)/(m_2 m_3) \in Fq$. Data processing device 140 may be configured to receive the request to process the message from transmitter 110, and receive, from server 130, the system parameter and the first ciphertext (e.g., $C2(pk_A, sk_R; X, (m_h, v_h))=\{c_{hij}\}$ ($h=1, 2, 3$)) that corresponds to the message, based at least in part on the received request.

In some embodiments, data processing device 140 may be configured to process the first ciphertext into a second ciphertext by performing a computation (e.g., addition, multiplication, quadratic function, etc.) on the first ciphertext, based at least in part on the received request, without deciphering the first ciphertext. For example, data processing device 140 may calculate the ciphertext $C2(pk_A, sk_R; X, (m^*, v^*))$ of $U^*=(U_1+U_2-U_3)/(U_2 U_3)=m^* 1+v^* B$, where $v^* \in Fq$ is a random number, as follows.

[Formula 6]

$$C2(pk_A, sk_R; X, (m_1, v_1)) \leftarrow \{c_{1ij}\} \\ C2(pk_A, sk_R; X, (m_2, v_2)) \leftarrow \{c_{2ij}\} \\ C2(pk_A, sk_R; X, (m_3, v_3)) \leftarrow \{c_{3ij}\} \\ C2(pk_A, sk_R; X, (m_1 + m_2 - m_3, v_{123})) = \\ C2(pk_A, sk_R; X, (m_1, v_1)) + \\ C2(pk_A, sk_R; X, (m_2, v_2)) - \\ C2(pk_A, sk_R; X, (m_3, v_3)) \bmod q \\ C2(pk_A, sk_R; X, (m_2 m_3, v_{23})) = \\ C2(pk_A, sk_R; (C2(pk_A, sk_R; X, (m_3, v_3))), (m_2, v_2)) \\ C2(pk_A, sk_R; X, (m^*, v^*)) = C2(pk_A, sk_R; X, \\ ((m_1 + m_2 - m_3)(m_2 m_3)^{-1}, v^*)) = \\ C2(pk_A, sk_R; (C2(pk_A, sk_R; X, ((m_2 m_3)^{-1}, v_{23inv}))), (m_1 + \\ m_2 - m_3, v_{123})) = \\ (c_{00}^* x_0 + c_{01}^* x_1 + \ldots + c_{07}^* x_7, \ldots \ldots \ldots c_{70}^* x_0 + \\ c_{71}^* x_1 + \ldots + c_{77}^* x_7)$$

Also, data processing device 140 may send the calculated ciphertext (e.g., $\{c^*_{ij}\}$ that are coefficients for the variable X in Formula 6 as the ciphertext) to transmitter 110 via a connection that may or may not be secure. Transmitter 110 may be configured to receive the ciphertext.

Transmitter 110 may be further configured to decipher the second ciphertext, based at least in part on the system parameter, the first public encryption key and the temporary secret decryption key corresponding to transmitter 110. For example, transmitter 110 may decipher $\{c^*_{ij}\}$ to obtain $U^* = (U_1 + U_2 - U_3)(U_2 U_3)^{-1}$ as follows.

$$Dec(sk_A, B, pk_Z; X, C2(pk_A, sk_R; X, (U_1 + U_2 - U_3)(U_2 U_3)^{-1})) = (U_1 + U_2 - U_3)(U_2 U_3)^{-1} \bmod q = U^* = m^*1 + v^*B = (u^*_0, \ldots, u^*_7)$$ [Formula 7]

Also, transmitter 110 may obtain $m^* = (m_1 + m_2 - m_3)(m_2 m_3)^{-1} \bmod q$ as follows.

$$v^* = u^*_1 / b_1 \bmod q,$$

$$m^* = u^*_0 - v^* b_0 = u^*_0 - (u^*_1/b_1) b_0 \bmod q.$$ [Formula 8]

In the manner as described above, transmitter 110 may be configured to obtain a deciphered process result that may be equal to a result of the requested computations or calculations on the requested message. Thus, based on the homomorphic public key encryption scheme on non-associative octonion ring over finite field, transmitter 110 may be configured to obtain a calculation result of encrypted messages without revealing original messages to data processing device 140, and may be configured to obtain a calculation result of the original messages by deciphering the calculation result of encrypted messages.

Figure 2:
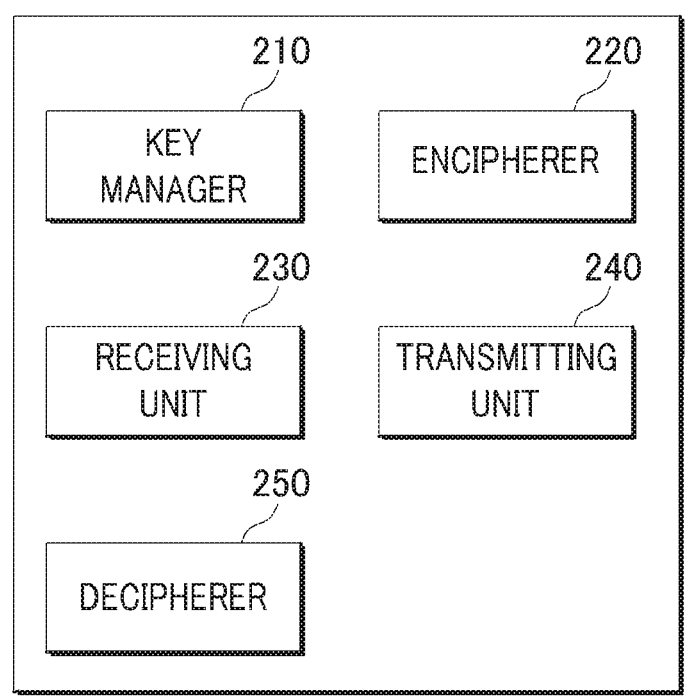
FIG. 2 shows a block diagram illustrating an example transmitter, arranged in accordance with at least some embodiments described herein.

FIG. 2 shows a block diagram illustrating an example transmitter, arranged in accordance with at least some embodiments described herein. As depicted in FIG. 2, for example, transmitter 110 may include a key manager 210, an encipherer 220, a receiving unit 230 and a transmitting unit 240. Although illustrated as discrete components, various components may be divided into additional components, combined into fewer components, or eliminated altogether while being contemplated within the scope of the disclosed subject matter. It will be understood by those skilled in the art that each function and/or operation of the components may be implemented, individually and/or collectively, by a wide range of hardware, software, firmware, or virtually any combination thereof. In that regard, one or more of key manager 210, encipherer 220, receiving unit 230 and transmitting unit 240 may be included in an instance of an application hosted by transmitter 110.

In some embodiments, key manager 210 may be configured to select a secret decryption key of transmitter 110 from an arbitrary element of the octonion ring "O" and to generate a first public encryption key for transmitter 110, based at least in part on the secret decryption key corresponding to transmitter 110 and a system parameter. The system parameter may be received from server 130. The system parameter may include at least one of a prime number q greater than 2, or an element $B = (b_0, \ldots, b_7)$ in an octonion ring over a finite field such that $|B|^2 = 0 \bmod q$, $B \neq 0 \bmod q$ and $b_0 \neq 0 \bmod q$. Further, encipherer 220 may be configured to encipher a message into a first ciphertext, based at least in part on the public encryption key corresponding to receiver 120 and the secret decryption key corresponding to transmitter 110.

In some embodiments, key manager 210 may be further configured to select a temporary secret decryption key for transmitter 110 from an arbitrary element of the octonion ring "O", generate a temporary public encryption key for transmitter 110, based at least in part on the temporary secret decryption key corresponding to transmitter 110 and the system parameter, and generate a second public encryption key for transmitter 110, based at least in part on the first public encryption key and the temporary secret decryption key corresponding to transmitter 110 and the system parameter. In this case, encipherer 220 may be configured to encipher the message into the first ciphertext further based on the temporary secret decryption key corresponding to transmitter 110. Transmitting unit 240 may be configured to transmit the first ciphertext to server 130.

In some embodiments, receiving unit 230 may be configured to receive, from server 130, the system parameter and the public encryption key of receiver 120.

Transmitting unit 240 may be configured to transmit, to data processing device 140, a request to process the message by processing the first ciphertext that corresponds to the message into a second ciphertext without deciphering the first ciphertext. Transmitting unit 240 may be further configured to transmit, to server 130, the public encryption key of transmitter 110 such that server 130 publishes the public encryption key corresponding to transmitter 110.

Transmitting unit 240 may be further configured to transmit, to server 130, the public encryption key of transmitter 110 such that server 130 publishes the public encryption key corresponding to transmitter 110. In this case, transmitter 110 may further include an decipherer 250 configured to decipher the second ciphertext, based at least in part on the system parameter, the first public encryption key and the temporary secret decryption key corresponding to transmitter 110, the deciphering of the second ciphertext including obtaining the processed message.

Figure 3:
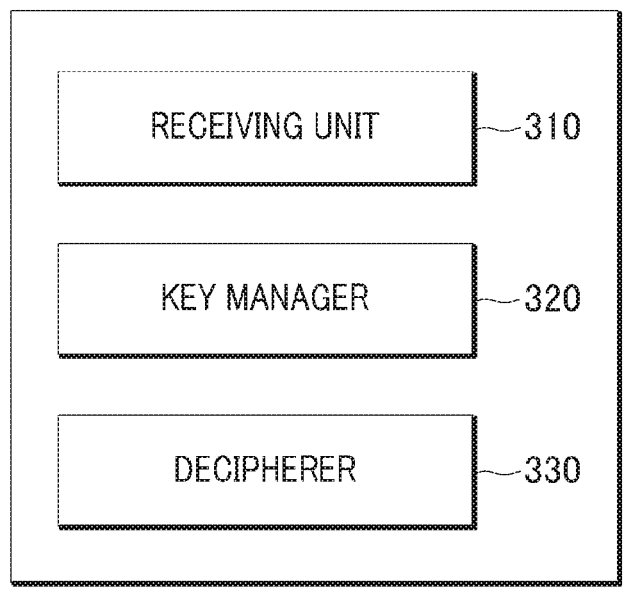
FIG. 3 shows a block diagram illustrating an example receiver, arranged in accordance with at least some embodiments described herein.

FIG. 3 shows a schematic block diagram illustrating an example receiver, arranged in accordance with at least some embodiments described herein. Receiver 120 may include a receiving unit 310, a key manager 320 and a decipherer 330. Although illustrated as discrete components, various components may be divided into additional components, combined into fewer components, or eliminated altogether while being contemplated within the scope of the disclosed subject matter. It will be understood by those skilled in the art that each function and/or operation of the components may be implemented, individually and/or collectively, by a wide range of hardware, software, firmware, or virtually any combination thereof. In that regard, one or more of receiving unit 310, key manager 320 and decipherer 330 may be included in an instance of an application hosted by receiver 120.

In some embodiments, receiving unit 310 may be configured to receive, from server 130, a system parameter and a public encryption key corresponding to transmitter 110. The system parameter may include at least one of a prime number q greater than 2, or an element $B = (b_0, \ldots, b_7)$ in an octonion ring over a finite field such that $|B|^2 = 0 \bmod q$, $B \neq 0 \bmod q$ and $b_0 \neq 0 \bmod q$. Further, receiving unit 310 may be configured to receive, from transmitter 110, a first ciphertext.

In some embodiments, key manager 320 may be configured to select a secret decryption key of receiver 120 and generate a public encryption key for receiver 120, based at least in part on the secret decryption key of receiver 120 and the system parameter.

Decipherer 330 may be configured to decipher the first ciphertext based at least in part on the secret decryption key of receiver 120, the system parameter and the public encryption key corresponding to transmitter 110.

Figure 4:
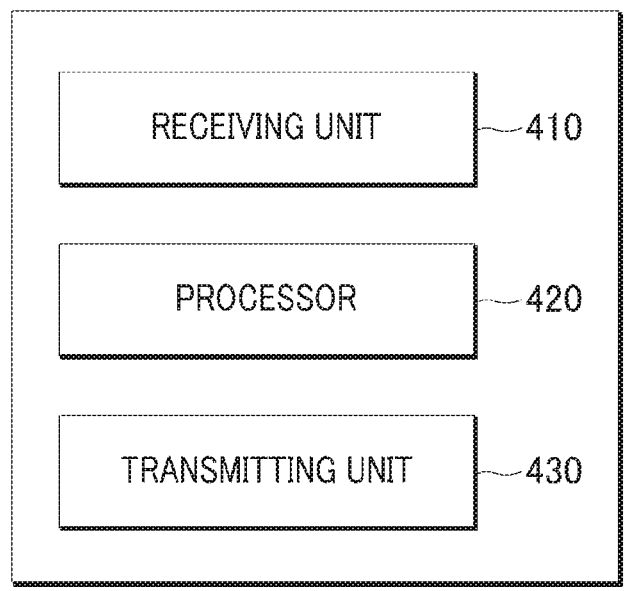
FIG. 4 shows a block diagram illustrating an example data processing device, arranged in accordance with at least some embodiments described herein.

FIG. 4 shows a schematic block diagram illustrating an example data processing device, arranged in accordance with at least some embodiments described herein. As depicted in FIG. 4, for example, data processing device 140 may include a receiving unit 410, a processor 420 and a transmitting unit 430. Although illustrated as discrete components, various components may be divided into additional components, combined into fewer components, or eliminated altogether while being contemplated within the scope of the disclosed subject matter. It will be understood by those skilled in the art that each function and/or operation of the components may be implemented, individually and/or collectively, by a wide range of hardware, software, firmware, or virtually any combination thereof. In that regard, one or more of receiving unit 410, processor 420 and transmitting unit 430 may be included in an instance of an application hosted by data processing device 140.

In some embodiments, receiving unit 410 may be configured to receive, from transmitter 110, a request to process a message. Receiving unit 410 may be further configured to receive, from server 130, a system parameter and a first ciphertext that corresponds to the message, based at least in part on the received request.

Processor 420 may be configured to process the first ciphertext into a second ciphertext by calculating the first ciphertext, based at least in part on the received request, without deciphering the first ciphertext. Transmitting unit 430 may be configured to transmit, to transmitter 110, the second ciphertext.

In some embodiments, the message may be enciphered to the first ciphertext by transmitter 110, based at least in part on a public encryption key and a secret decryption key corresponding to transmitter 110.

Figure 5:
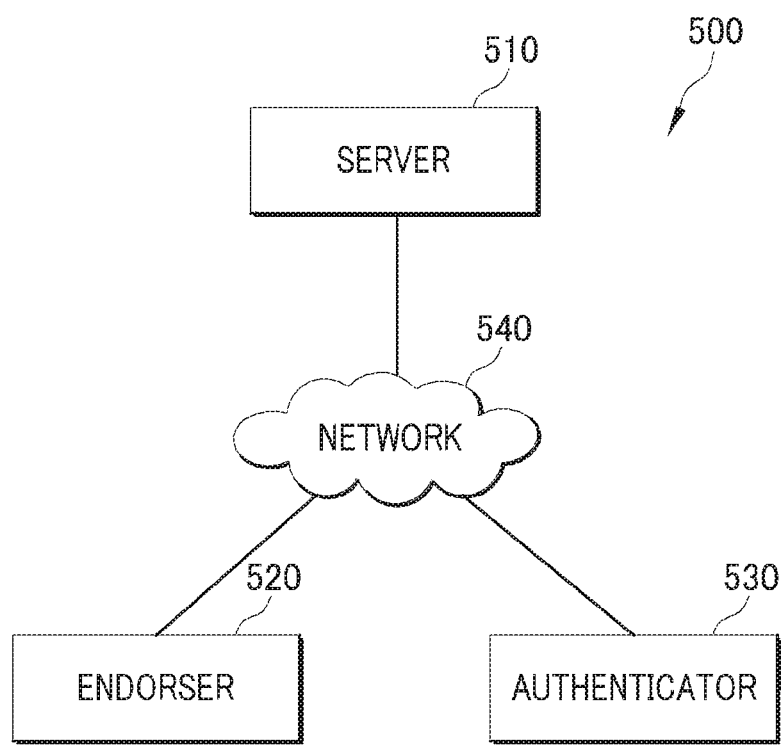
FIG. 5 shows an illustrative example of a homomorphic signature system, arranged in accordance with at least some embodiments described herein.

FIG. 5 schematically shows an illustrative example of a homomorphic signature system 500, arranged in accordance with at least some embodiments described herein. As illustrated in FIG. 5, homomorphic signature system 500 may include a server 510, an endorser 520 and an authenticator 530, which may be connected to each other via a network. The network may refer to a component or module that may be configured to communicatively couple two or more of server 510, endorser 520 and authenticator 530. Non-limiting examples of the network may include a wired network such as a LAN (Local Area Network), a WAN (Wide Area Network), a VAN (Value Added Network) or the like, or various other wireless networks such as a mobile radio communication network including at least one of a 3G mobile telecommunications network, a 4th or 5th generation mobile telecommunications network, various other mobile telecommunications networks, a satellite network, WiBro, Mobile WiMAX, HSDPA, or the like. Alternatively, the network may include at least one of an NFC, Bluetooth, or P2P communication protocol.

For example, but not as a limitation, respective one of endorser 520 and authenticator 530 may refer to at least one of a smart phone, a portable device, a notebook computer, a tablet device, a phablet device, a personal computer or a personal communication terminal, such as PCS (Personal Communication System), GMS (Global System for Mobile communications), PDC (Personal Digital Cellular), PDA (Personal Digital Assistant). Endorser 520 and authenticator 530 may be capable of full duplex radio communications. Further, for example, server 510 may include a cloud datacenter.

In some embodiments, endorser 520 may be configured to receive, from server 510, a signing parameter. The signing parameter may include at least one of a prime number q greater than 2, or an element $B=(b_0, \ldots, b_7)$ in an octonion ring (e.g., represented by "O") over a finite field such that $|B|^2=0 \bmod q$, $B \neq 0 \bmod q$ and $b_0 \neq 0 \bmod q$, or an element C in the octonion ring such that $C=1-B \bmod q$. Let $X=(x_0, \ldots, x_7) \in O[X]$ be a variable, and $Y=(y_0, \ldots, y_7) \in O[Y]$ be another variable, which are selected from the octonion ring "O."

In some embodiments, endorser 520 may be further configured to select a secret key corresponding to endorser 520, and generate a public signing key for endorser 520, based at least in part on the secret key corresponding to endorser 520 and the signing parameter. Further, endorser 520 may be configured to calculate a signature corresponding to a message, based at least in part on the public signing key corresponding to endorser 520 and the signing parameter. Endorser 520 may be further configured to transmit, to server 510, the signature and the public signing key.

For example, endorser 520 may select a secret key $A:=(A_1, \ldots, A_k) \in O^k$ such that the inverse $A_i^{-1}$ ($i=1, \ldots, k$) exists, where k is an integer. Let $A^{-1}:=(A_1^{-1}, \ldots, A_k^{-1}) \in O^k$. For example, if $|A|^2 \neq 0 \bmod q$ for octonion $A=(a_0, a_1, \ldots, a_7)$, the inverse of A can be calculated by $A^{-1}=(a_0 S^{-1} \bmod q, -a_1 S^{-1} \bmod q, \ldots, -a_7 S^{-1} \bmod q)$ where $S=a_0^2+a_1^2+\ldots+a_7^2 \bmod q$. Further, the public signing key $A(X,Y)$ may be generated using the variable X and Y and the secret key A and its inverse, as follows.

$$A(X, Y) = \quad \text{[Formula 9]}$$
$$A_k( \ldots (A_1(Y(A_k^{-1}( \ldots (A_1^{-1}X) \ldots) \bmod q \in O[X, Y] =$$
$$(a_{000}x_0 y_0 + a_{0001}x_0 y_1 + \ldots + a_{007}x_0 y_7 + \ldots +$$
$$a_{070}x_7 y_0 + a_{071}x_7 y_1 + \ldots + a_{077}x_7 y_7, \ldots$$
$$\ldots \ldots a_{700}x_0 y_0 +$$
$$a_{701}x_0 y_1 + \ldots + a_{707}x_0 y_7 + \ldots +$$
$$a_{770}x_7 y_0 + a_{771}x_7 y_1 + \ldots + a_{777}x_7 y_7)$$

Let $m_h \in Fq^*$ ($h=1, \ldots, n$) be messages which endorser 520 may store in its database. Also, let $v_h \in Fq^*$ ($h=1, \ldots, n$) be random numbers selected by endorser 520. Let $U_h=(u_{h0}, \ldots, u_{h7}):=m_h B+v_h C \in O$ ($h=1, \ldots, n$) be a medium message and $(m_h, v_h):=m_h B+v_h C \in O$ ($h=1, \ldots, n$). Endorser 520 may be configured to calculate $\sigma(X)=(\sigma_1(X), \ldots, \sigma_n(X)) \in O[X]^n$ where $\sigma_i(X):=A_k( \ldots (A_1(U_i(A_1^{-1}( \ldots (A_k^{-1}(X) \ldots )) \ldots ) \bmod q \in O[X]$, ($i=1, \ldots, n$). $\sigma_h(X)$ indicates a signature corresponding to the medium message $U_h=m_h B+v_h C$, ($h=1, \ldots, n$). Also, $\sigma_h(X)$ may be represented as follows.

$$\sigma_h(X) = (C_{h00}x_0 + C_{h01}x_1 + \ldots + C_{h07}x_7, \quad \text{[Formula 10]}$$
$$\ldots \ldots \ldots C_{h70}x_0 + C_{h71}x_1 + \ldots + C_{h77}x_7)$$

Accordingly, the signature may be represented by $\sigma_h(X)=\{c_{hij}\} \in F_q^{8 \times 8}$ ($h=1, \ldots, n$). Also, let $\sigma(X)=(\sigma_1(X), \ldots, \sigma_n(X)) \in O[X]^n$, $m:=(m_1, \ldots, m_n) \in Fq^{on}$, $v:=(v_1, \ldots, v_n) \in Fq^{on}$, and $\eta:=A_k( \ldots (A_1 C) \ldots ) \bmod q \in O$. Endorser 520 may be configured to send $(\sigma(X), q, \eta, v)$ to server 510 as the signed data of endorser 520 via a connection that may or may not be secure. Server 510 may receive $(\sigma(X), q, \eta, v)$ from endorser 520 and store the received $(\sigma(X), q, \eta, v)$ as the signed data of endorser 520.

In some embodiments, endorser 520 may be further configured to transmit, to authenticator 530, a request to evaluate the signature. Authenticator 530 may be configured to evaluate the signature to be converted to a derived signature based at least in part on the request. For example, authenticator 530 may be an entity or computing device which performs data-processing (e.g., evaluation of the signature) requested by endorser 520. Authenticator 530 may be requested to compute $<f>=\{e_{ji}\}$ by using the signed data of endorser 520 such that $f((\sigma(X)))=f(\sigma_1(X), \ldots, \sigma_n(X))=A_k(\ldots(A_1(g(U)(A_1^{-1}(\ldots(A_k^{-1}X)\ldots))\ldots)$ mod $q \in O[X]$ where $f \in F:O[X]'' \to O[X]$. In this case, authenticator 530 may compute $f((\sigma(X))$ by using an algorithm Evaluate $(\sigma(X); f)$ for a part of the signed data of endorser 520 $((\sigma(X),q))$ such that $\sigma'(X):=f((\sigma(X)) \leftarrow \text{Evaluate}(\sigma(X); f)$.

In some embodiments, endorser 520 may be further configured to receive, from authenticator 530, the derived signature and receive, from the server, the public signing key. In this case, endorser 520 may verify the derived signature based at least in part on the public signing key to determine whether authenticator 530 correctly evaluates the signature.

For example, endorser 520 may receive $[<f>, f(\sigma(X))]$ from authenticator 530 and receive $(q, \eta, v)$ from server 510 where $(\eta, v)$ is a public verification key of endorser 520. Endorser 520 may verify that authenticator 530 correctly applied f to the data set of endorser 520 by using an algorithm Verify(pk; σ'(X); g)=1 or 0. For example, in case that $U=(U_1,U_2,U_3)$, endorser 520 may retrieve f'($m_1,m_2,m_3$) by using sk=(($A_1, \ldots, A_k$)∈$O^k$, B∈O, C∈O) as follows.

[Formula 11]

$$A_1^{-1}(\ldots(A_k^{-1}(\sigma'(\alpha))\ldots) =$$
$$A_1^{-1}(\ldots(A_k^{-1}((A_k(\ldots(A_1(g(U)(A_1^{-1}(\ldots(A_k^{-1}\alpha)\ldots))\ldots)$$
$$\text{mod}q \text{ where } \alpha := A_k(\ldots(A_1B)\ldots)\text{mod}q, =$$
$$g(U)(A_1^{-1}(\ldots(A_k^{-1}(A_k(\ldots(A_1B)\ldots)\ldots)\text{mod}q =$$
$$g(U)B\text{mod}q = [g(m_1B, \ldots, m_nB)+$$
$$g(v_1C, \ldots, v_nC)]B\text{mod}q = [$$
$$g(m_11, m_21, m_31)B + g(v_11, \ldots, v_n1)C]B\text{mod}q =$$
$$g(m_11, m_21, m_31)B^2\text{mod}q = f'(m_1, m_2, m_3)$$
$$1B\text{mod}q = f'(m_1, m_2, m_3)B\text{mod}q.$$

Then we have
$$f'(m_1, m_2, m_3) = 2[f'(m_1, m_2, m_3)B]_o,$$

Figure 6:
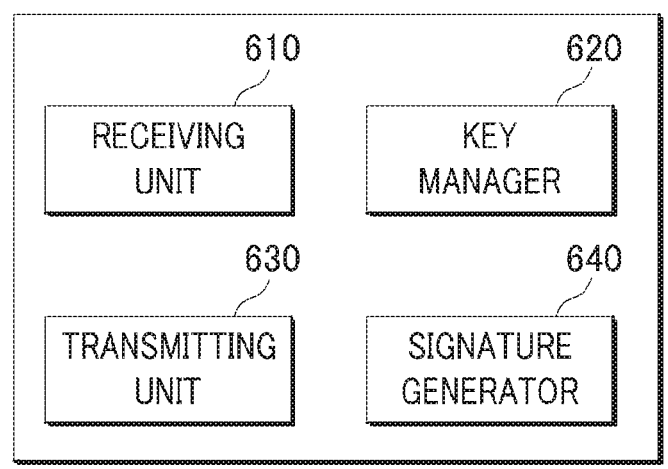
FIG. 6 shows a block diagram illustrating an example endorser, arranged in accordance with at least some embodiments described herein.

FIG. 6 shows a schematic block diagram illustrating an example endorser 520, arranged in accordance with at least some embodiments described herein. As depicted in FIG. 6, for example, endorser 520 may include a receiving unit 610, a key manager 620, a transmitting unit 630 and a signature generator 640. Although illustrated as discrete components, various components may be divided into additional components, combined into fewer components, or eliminated altogether while being contemplated within the scope of the disclosed subject matter. It will be understood by those skilled in the art that each function and/or operation of the components may be implemented, individually and/or collectively, by a wide range of hardware, software, firmware, or virtually any combination thereof. In that regard, one or more of receiving unit 610, key manager 620, transmitting unit 630 and signature generator 640 may be included in an instance of an application hosted by endorser 520.

In some embodiments, receiving unit 610 may be configured to receive, from server 510, a signing parameter. For example, the signing parameter may include at least one of a prime number q greater than 2, or an element $B=(b_0, \ldots, b_7)$ in an octonion ring over a finite field such that $|B|^2=0$ mod q, $B \neq 0$ mod q and $b_0 \neq 0$ mod q, or an element C in the octonion ring such that C=1−B mod q.

In some embodiments, key manager 620 may be configured to select a secret key corresponding to endorser 520, and generate a public signing key for endorser 520, based at least in part on the secret key corresponding to endorser 520 and the signing parameter. Further, signature generator 640 may be configured to calculate a signature corresponding to a message, based at least in part on the public signing key corresponding to endorser 520 and the signing parameter.

In some embodiments, transmitting unit 630 may be configured to transmit, to server 510, the signature and the public signing key. Transmitting unit 630 may be further configured to transmit, to authenticator 530, a request to evaluate the signature. In this case, authenticator 530 may be configured to evaluate the signature to be converted to a derived signature based at least in part on the request. Receiving unit 610 may be further configured to receive, from authenticator 530, the derived signature and receive, from server 510, the public signing key. In this case, endorser 520 may further include a verifier (not shown) configured to verify the derived signature based at least in part on the public signing key to determine whether authenticator 530 correctly evaluates the signature.

Figure 7:
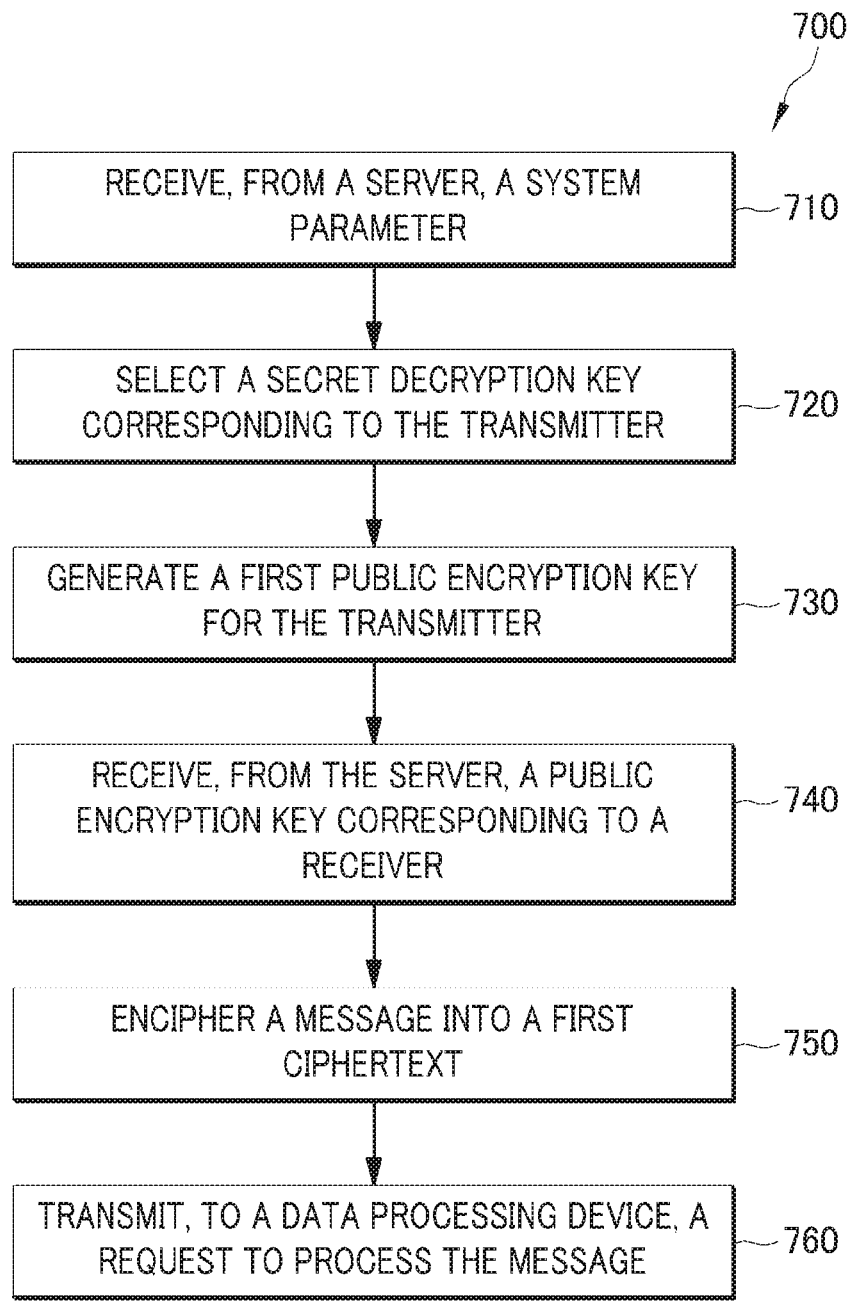
FIG. 7 shows an example flow diagram of a process of a transmitter to implement a homomorphic public key encryption scheme, arranged in accordance with at least some embodiments described herein.

FIG. 7 schematically shows an example flow diagram of a process 700 of a transmitter to implement a homomorphic public key encryption scheme, arranged in accordance with at least some embodiments described herein. The operations of process 700 may be implemented by system 100 including transmitter 110, receiver 120, server 130 and/or data processing device 140, as illustrated in FIGS. 1 to 4. Process 700 may include one or more operations, actions, or functions as illustrated by one or more blocks 710, 720, 730, 740, 750 and/or 760. Although illustrated as discrete blocks, various blocks may be divided into additional blocks, combined into fewer blocks, or eliminated, depending on the desired implementation. Processing may begin at block 710.

At block 710 (Receive, From a Server, a System Parameter), transmitter 110 may receive, from server 130, a system parameter. The system parameter may be represented at least in part in a non-associative octonion ring, and may include at least one of a prime number q greater than 2, or an element $B=(b_0, \ldots, b_7)$ in an octonion ring over a finite field such that $|B|^2=0$ mod q, $B \neq 0$ mod q and $b_0 \neq 0$ mod q. Processing may proceed from block 710 to block 720.

At block 720 (Select a Secret Decryption Key Corresponding To the Transmitter), transmitter 110 may select a secret decryption key corresponding to transmitter 110, which may be represented in a non-associative octonion ring. In some embodiments, the secret decryption key of transmitter 110 may be selected such that an inverse of the secret decryption key exists. Processing may proceed from block 720 to block 730.

At block 730 (Generate a First Public Encryption Key For The Transmitter), transmitter 110 may generate a first public encryption key for transmitter 110, based at least in part on the secret decryption key corresponding to transmitter 110 and the system parameter. For example, the first public encryption key may be represented in a non-associative octonion ring. In some embodiments, transmitter 110 may transmit, to server 130, the public encryption key of transmitter 110 such that server 130 publishes the public encryption key of transmitter 110. Processing may proceed from block 730 to block 740.

At block 740 (Receive, From the Server, a Public Encryption Key Corresponding To a Receiver), transmitter 110 may receive, from server 130, a public encryption key corresponding to receiver 120. For example, the public encryption key corresponding to receiver 120 may be represented in a non-associative octonion ring. Processing may proceed from block 740 to block 750.

At block 750 (Encipher a Message Into a First Ciphertext), transmitter 110 may encipher a message into a first ciphertext, based at least in part on the public encryption key corresponding to receiver 120 and the secret decryption key corresponding to transmitter 110. For example, the message or the first ciphertext may be represented in a non-associative octonion ring. In some embodiments, transmitter 110 may select a temporary secret decryption key corresponding to transmitter 110, and generate a temporary public encryption key of transmitter 110, based at least in part on the temporary secret decryption key corresponding to transmitter 110 and the system parameter. Further, transmitter 110 may generate a second public encryption key for transmitter 110, based at least in part on the first public encryption key and the temporary secret decryption key corresponding to transmitter 110 and the system parameter. In this case, the enciphering may be further based on the temporary secret decryption key corresponding to transmitter 110. In some other embodiments, transmitter 110 may generate a public encryption key for transmitter 110 and for receiver 120, based at least in part on a public encryption key corresponding to receiver 120, the secret decryption key corresponding to transmitter 110 and the system parameter. Further, transmitter 110 may transmit, to server 130, the first ciphertext. In this case, the enciphering may be further based on the secret decryption key corresponding to transmitter 110. Processing may proceed from block 750 to block 760.

At block 760 (Transmit, To a Data Processing Device, a Request To Process the Message), transmitter 110 may transmit, to data processing device 140, a request to process the message by processing the first ciphertext that corresponds to the message into a second ciphertext without deciphering the first ciphertext. For example, the second ciphertext may be represented at least in part in a non-associative octonion ring. In some embodiments, transmitter 110 may receive, from data processing device 140, the second ciphertext, and decipher the second ciphertext, based at least in part on the system parameter, the first public encryption key and the temporary secret decryption key corresponding to transmitter 110. In this case, the deciphering of the second ciphertext may include obtaining the processed message.

Figure 8:
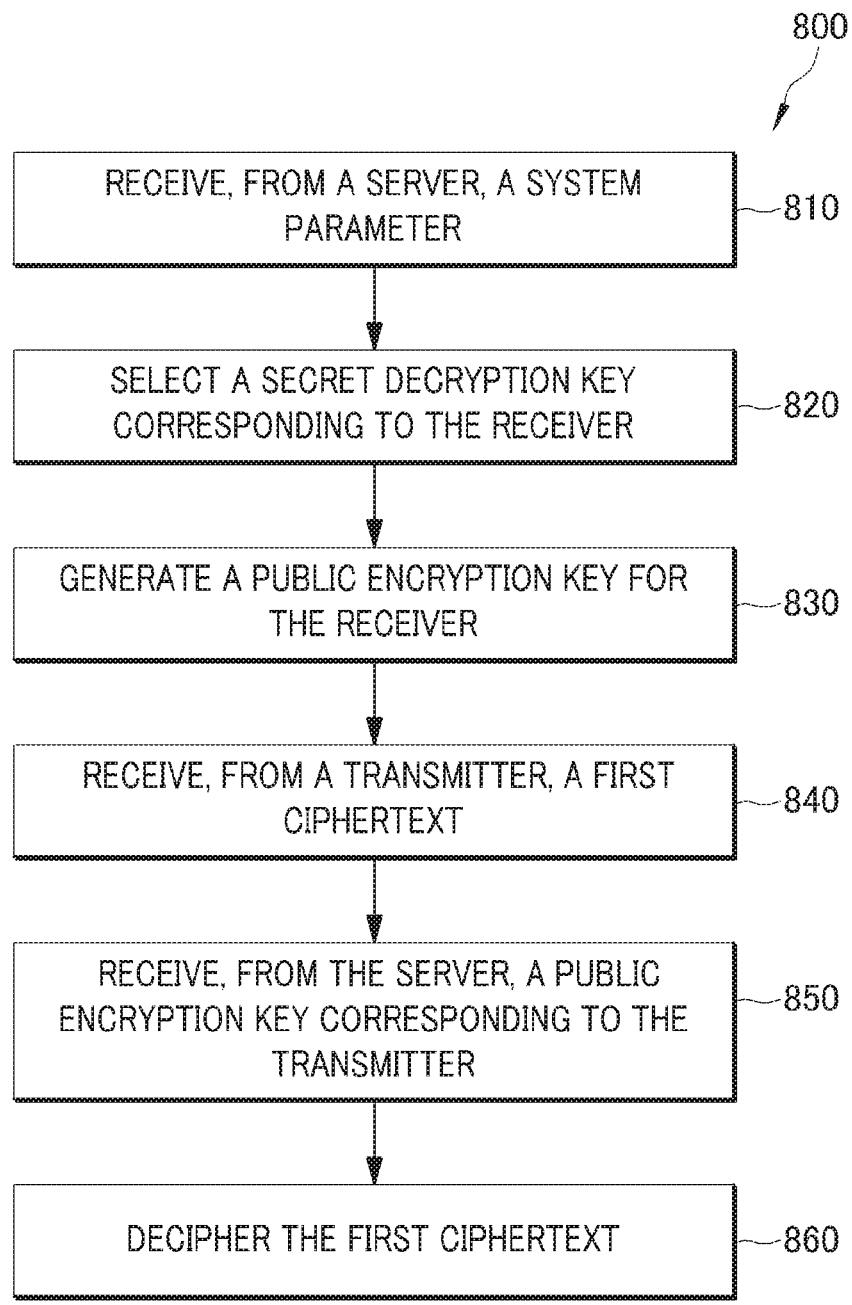
FIG. 8 shows an example flow diagram of a process of a receiver to implement a homomorphic public key encryption scheme, arranged in accordance with at least some embodiments described herein.

FIG. 8 schematically shows an example flow diagram of a process 800 of a receiver to implement a homomorphic public key encryption scheme, arranged in accordance with at least some embodiments described herein. The operations of process 800 may be implemented by system 100 including transmitter 110, receiver 120, server 130 and/or data processing device 140, as illustrated in FIGS. 1 to 4. Process 800 may include one or more operations, actions, or functions as illustrated by one or more blocks 810, 820, 830, 840, 850 and/or 860. Although illustrated as discrete blocks, various blocks may be divided into additional blocks, combined into fewer blocks, or eliminated, depending on the desired implementation. Processing may begin at block 810.

At block 810 (Receive, From a Server, a System Parameter), receiver 120 may receive, from server 130, a system parameter. For example, the system parameter may be represented includes at least in part in a non-associative octonion ring, and may include one of a prime number q greater than 2, or an element $B=(b_0, \ldots, b_7)$ in an octonion ring over a finite field such that $|B|^2=0 \bmod q$, $B \neq 0 \bmod q$ and $b_0 \neq 0 \bmod q$. Processing may proceed from block 810 to block 820.

At block 820 (Select a Secret Decryption Key Corresponding To the Receiver), receiver 120 may select a secret decryption key corresponding to receiver 120. For example, the secret decryption key may be represented in a non-associative octonion ring. In some embodiments, the secret decryption key corresponding to receiver 120 may be selected such that an inverse of the secret decryption key exists. Processing may proceed from block 820 to block 830.

At block 830 (Generate a Public Encryption Key For the Receiver), receiver 120 may generate a public encryption key for receiver 120, based at least in part on the secret decryption key corresponding to receiver 120 and the system parameter. For example, the public encryption key for receiver 120 may be represented in a non-associative octonion ring. In some embodiments, receiver 120 may transmit the public encryption key corresponding to receiver 120, to server 130, such that server 130 publishes the public encryption key corresponding to receiver 120. Processing may proceed from block 830 to block 840.

At block 840 (Receive, From a Transmitter, a First Ciphertext), receiver 120 may receive, from transmitter 110, a first ciphertext. For example, the first ciphertext may be represented in a non-associative octonion ring. Processing may proceed from block 840 to block 850.

At block 850 (Receive, From the Server, a Public Encryption Key Corresponding To the Transmitter), receiver 120 may receive, from server 130, a public encryption key corresponding to transmitter 110. For example, the public encryption key for transmitter 110 may be represented in a non-associative octonion ring. Processing may proceed from block 850 to block 860.

At block 860 (Decipher the First Ciphertext), receiver 120 may decipher the first ciphertext based at least in part on the secret decryption key of receiver 120, the system parameter and the public encryption key corresponding to transmitter 110.

Figure 9:
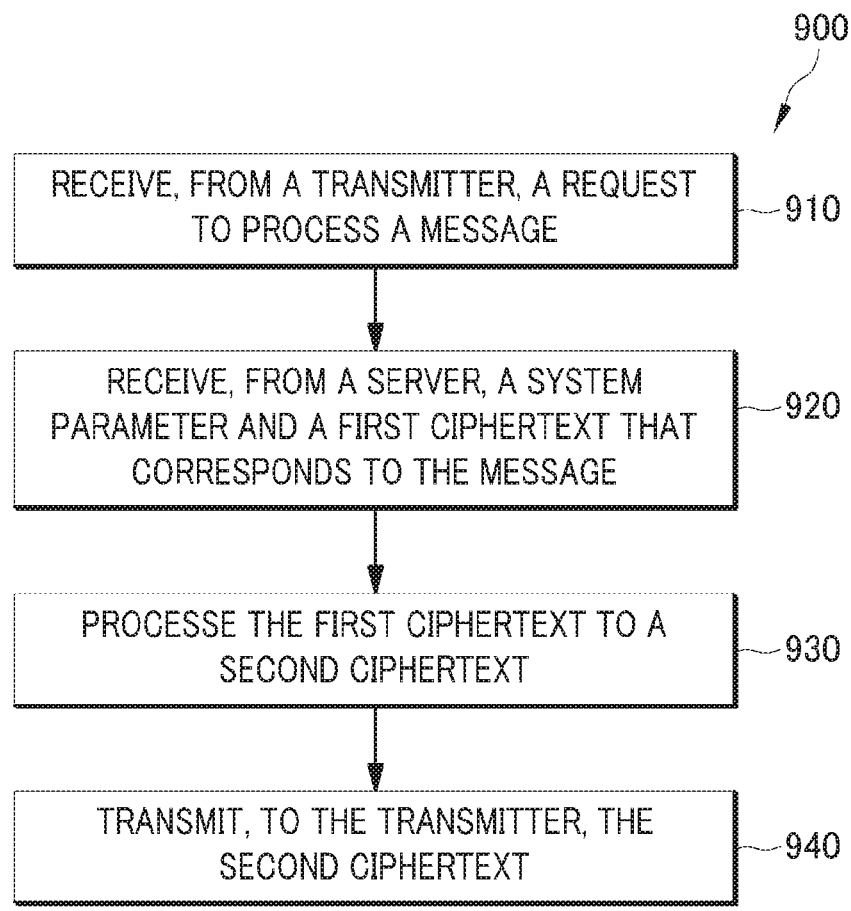
FIG. 9 shows an example flow diagram of a process of a data processing device to implement a homomorphic public key encryption scheme, arranged in accordance with at least some embodiments described herein.

FIG. 9 shows an example flow diagram of a process 900 of a data processing device to implement a homomorphic public key encryption scheme, arranged in accordance with at least some embodiments described herein. The operations of process 900 may be implemented by system 100 including transmitter 110, receiver 120, server 130 and/or data processing device 140, as illustrated in FIGS. 1 to 4. Process 900 may include one or more operations, actions, or functions as illustrated by one or more blocks 910, 920, 930 and/or 940. Although illustrated as discrete blocks, various blocks may be divided into additional blocks, combined into fewer blocks, or eliminated, depending on the desired implementation. Processing may begin at block 910.

At block 910 (Receive, From a Transmitter, a Request To Process a Message), data processing device 140 may receive, from transmitter 110, a request to process a message. Processing may proceed from block 910 to block 920.

At block 920 (Receive, From a Server, a System Parameter And a First Ciphertext That Corresponds To the Message), data processing device 140 may receive, from server 130, a system parameter and a first ciphertext that corresponds to the message, based at least in part on the received request. In some embodiments, the message may be enciphered to the first ciphertext by transmitter 110, based at least in part on a public encryption key and a secret decryption key corresponding to transmitter 110. Processing may proceed from block 920 to block 930.

At block 930 (Process the First Ciphertext To a Second Ciphertext), data processing device 140 may process the first ciphertext to a second ciphertext by calculating the first ciphertext, based at least in part on the received request, without deciphering the first ciphertext. Processing may proceed from block 930 to block 940.

At block 940 (Transmit, To the Transmitter, the Second Ciphertext), data processing device 140 may transmit, to transmitter 110, the second ciphertext.

Figure 10:
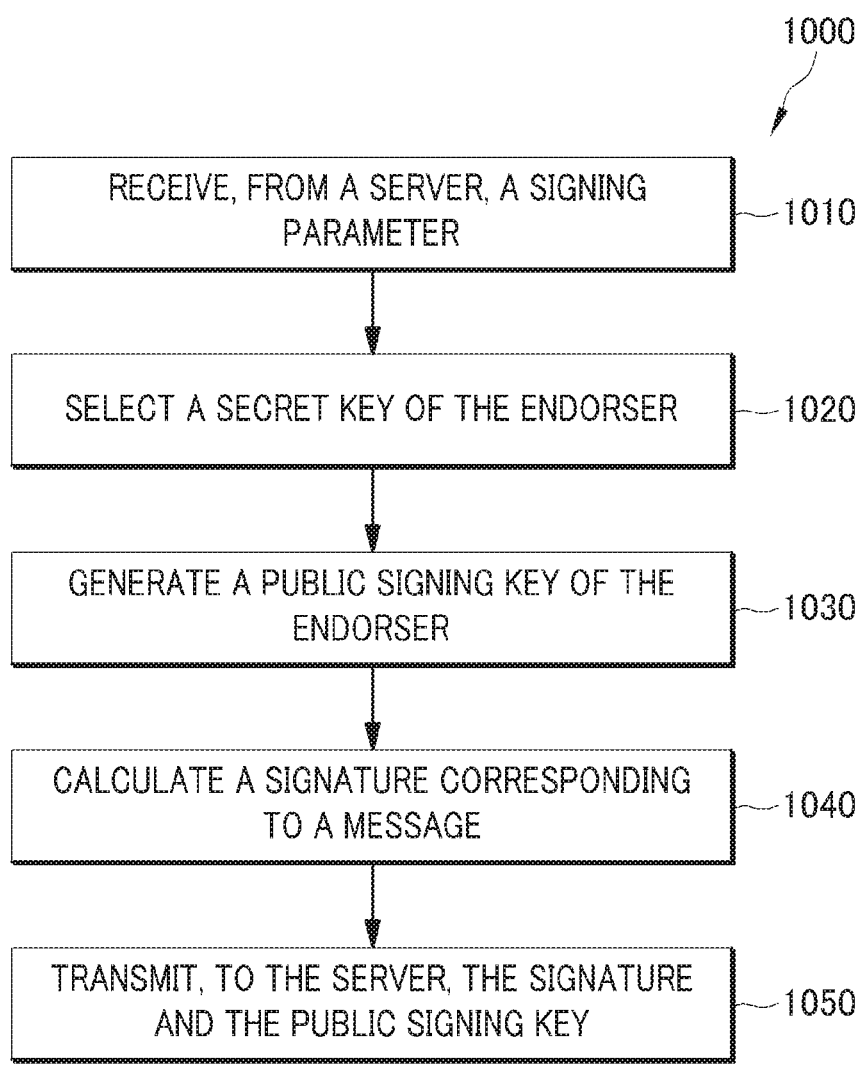
FIG. 10 shows an example flow diagram of a process of an endorser to implement a homomorphic signature scheme, arranged in accordance with at least some embodiments described herein.

FIG. 10 schematically shows an example flow diagram of a process 1000 of an endorser to implement a homomorphic signature scheme, arranged in accordance with at least some embodiments described herein. The operations of process 1000 may be implemented by system 500 including server 510, endorser 520 and authenticator 530, as illustrated in FIGS. 5 and 6. Process 1000 may include one or more operations, actions, or functions as illustrated by one or more blocks 1010, 1020, 1030, 1040 and/or 1050. Although illustrated as discrete blocks, various blocks may be divided into additional blocks, combined into fewer blocks, or eliminated, depending on the desired implementation. Processing may begin at block 1010.

At block 1010 (Receive, From a Server, a Signing Parameter), endorser 520 may receive, from server 510, a signing parameter. For example, the signing parameter may be represented at least in part in a non-associative octonion ring, and may include at least one of a prime number q greater than 2, or an element $B=(b_0, \ldots, b_7)$ in an octonion ring over a finite field such that $|B|^2=0$ mod q, $B \neq 0$ mod q and $b_0 \neq 0$ mod q, or an element C in the octonion ring such that $C=1-B$ mod q. Processing may proceed from block 1010 to block 1020.

At block 1020 (Select a Secret Key Of the Endorser), endorser 520 may select a secret key of endorser 520. For example, the secret key of endorser 520 may be represented at least in part in a non-associative octonion ring. Processing may proceed from block 1020 to block 1030.

At block 1030 (Generate a Public Signing Key Of the Endorser), endorser 520 may generate a public signing key of endorser 520, based at least in part on the secret key corresponding to endorser 520 and the signing parameter. For example, the public signing key of endorser 520 may be represented at least in part in a non-associative octonion ring. Processing may proceed from block 1030 to block 1040.

At block 1040 (Calculate a Signature Corresponding To a Message), endorser 520 may calculate a signature corresponding to a message, based at least in part on the public signing key corresponding to endorser 520 and the signing parameter. For example, the signature and the message may be represented at least in part in a non-associative octonion ring. Processing may proceed from block 1040 to block 1050.

At block 1050 (Transmit, To the Server, the Signature and the Public Signing Key), endorser may transmit, to server 150, the signature and the public signing key. In some embodiments, endorser 520 may transmit, to authenticator 530, a request to evaluate the signature. Authenticator 530 may evaluate the signature to be converted to a derived signature, based at least in part on the request. Then, endorser 520 may receive, from authenticator 530, the derived signature, and receive, from server 510, the public signing key. Further, endorser may verify the derived signature based at least in part on the public signing key, where the verifying of the derived signature indicates whether the authenticator correctly evaluates the signature.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 11:
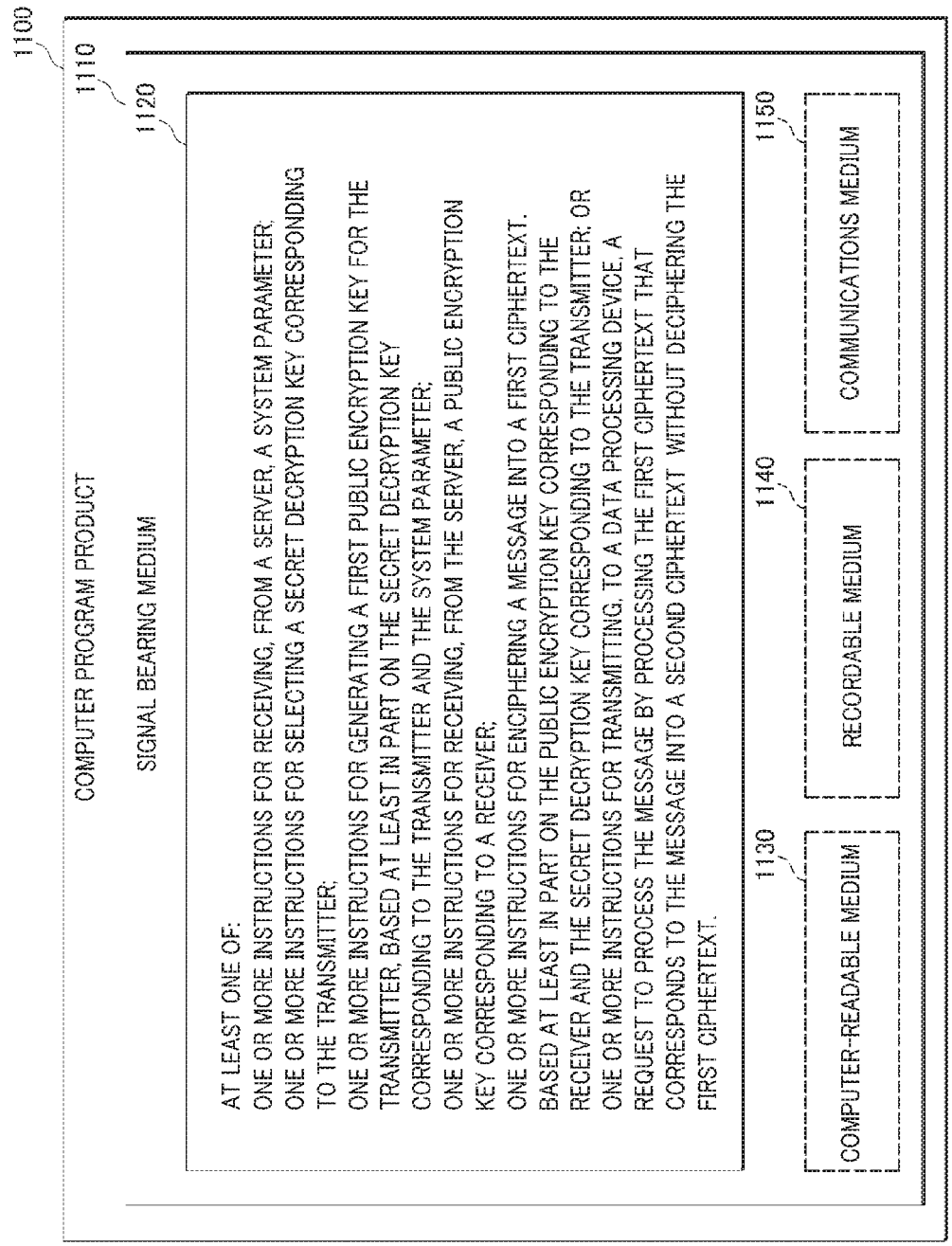
FIG. 11 illustrates computer program products that may be utilized to provide a homomorphic public key encryption scheme, arranged in accordance with at least some embodiments described herein.

FIG. 11 illustrates computer program products that may be utilized to provide a homomorphic public key encryption scheme, arranged in accordance with at least some embodiments described herein. Program product 1100 may include a signal bearing medium 1110. Signal bearing medium 1110 may include one or more instructions 1120 that, when executed by, for example, a transmitter, may provide the functionality described above with respect to FIGS. 1-10. By way of example, instructions 1120 may include: one or more instructions for receiving, from a server, a system parameter; one or more instructions for selecting a secret decryption key corresponding to the transmitter; one or more instructions for generating a first public encryption key for the transmitter, based at least in part on the secret decryption key corresponding to the transmitter and the system parameter; one or more instructions for receiving, from the server, a public encryption key corresponding to a receiver; one or more instructions for enciphering a message into a first ciphertext, based at least in part on the public encryption key corresponding to the receiver and the secret decryption key corresponding to the transmitter; or one or more instructions for transmitting, to a data processing device, a request to process the message by processing the first ciphertext that corresponds to the message into a second ciphertext without deciphering the first ciphertext. Thus, for example, referring to FIG. 2, transmitter 110 may undertake one or more of the blocks shown in FIG. 7 in response to instructions 1120.

In some implementations, signal bearing medium 1110 may encompass a computer-readable medium 1130, such as, but not limited to, a hard disk drive, a CD, a DVD, a digital tape, memory, etc. In some implementations, signal bearing medium 1110 may encompass a recordable medium 1140, such as, but not limited to, memory, read/write (R/W) CDs, R/W DVDs, etc. In some implementations, signal bearing medium 1110 may encompass a communications medium 1150, such as, but not limited to, a digital and/or an analog communication medium (e.g., a fiber optic cable, a waveguide, a wired communications link, a wireless communication link, etc.). Thus, for example, program product 1100 may be conveyed to one or more modules of transmitter 110, receiver 120, server 130 or data processing device 140 by an RF signal bearing medium 1120, where the signal bearing medium 1120 is conveyed by a wireless communications medium 1150 (e.g., a wireless communications medium conforming with the IEEE 802.11 standard).

Figure 12:
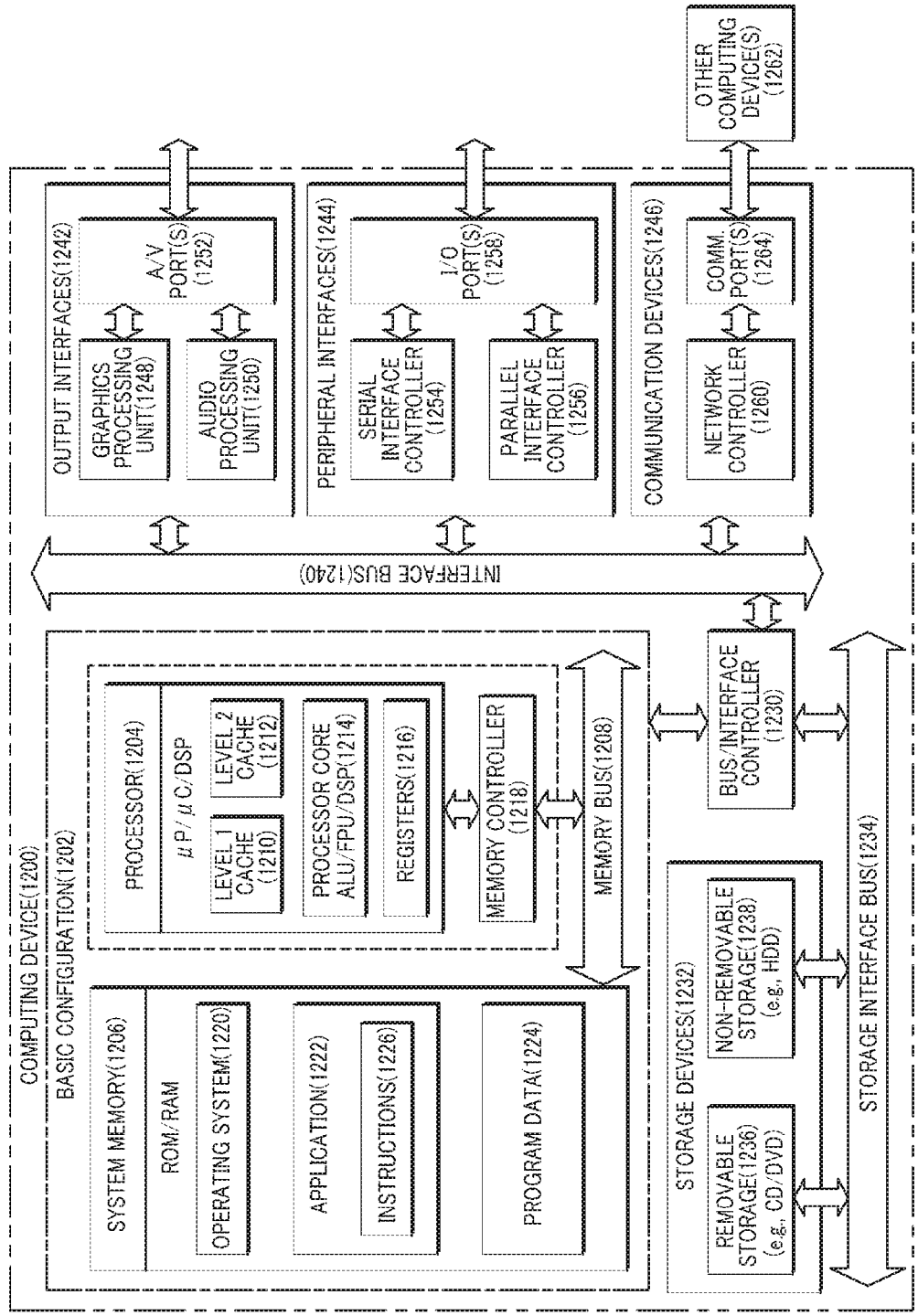
FIG. 12 is a block diagram illustrating an example computing device that may be utilized to provide a homomorphic public key encryption scheme, arranged in accordance with at least some embodiments described herein.

FIG. 12 is a block diagram illustrating an example computing device 1200 that may be utilized to provide a homomorphic public key encryption scheme, arranged in accordance with at least some embodiments described herein. In these examples, elements of computing device 1200 may be arranged or configured for a device. In a very basic configuration 1202, computing device 1200 typically includes one or more processors 1204 and a system memory 1206. A memory bus 1208 may be used for communicating between processor 1204 and system memory 1206.

Depending on the desired configuration, processor 1204 may be of any type including but not limited to a microprocessor (μP), a microcontroller (μC), a digital signal processor (DSP), or any combination thereof. Processor 1204 may include one more levels of caching, such as a level one cache 1210 and a level two cache 1212, a processor core 1214, and registers 1216. An example processor core 1214 may include an arithmetic logic unit (ALU), a floating point unit (FPU), a digital signal processing core (DSP Core), or any combination thereof. An example memory controller 1218 may also be used with processor 1204, or in some implementations memory controller 1218 may be an internal part of processor 1204.

Depending on the desired configuration, system memory 1206 may be of any type including but not limited to volatile memory (such as RAM), nonvolatile memory (such as ROM, flash memory, etc.) or any combination thereof. System memory 1206 may include an operating system 1220, one or more applications 1222, and program data 1224. Application 1222 may include instructions 1226 that may be arranged to perform the functions as described herein including the actions described with respect to transmitter, receiver, server, data processing device, endorser or authenticator architectures as shown in FIGS. 1-6 or including the actions described with respect to the flow charts shown in FIGS. 7-10. In some examples, application 1222 may be arranged to operate with program data 1224 on an operating system 1220 such that the fully homomorphic public key encryption scheme as described herein may be provided.

Computing device 1200 may have additional features or functionality, and additional interfaces to facilitate communications between basic configuration 1202 and any required devices and interfaces. For example, a bus/interface controller 1230 may be used to facilitate communications between basic configuration 1202 and one or more data storage devices 1232 via a storage interface bus 1234. Data storage devices 1232 may be removable storage devices 1236, non-removable storage devices 1238, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 1206, removable storage devices 1236 and non-removable storage devices 1238 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 1200. Any such computer storage media may be part of computing device 1200.

Computing device 1200 may also include an interface bus 1240 for facilitating communication from various interface devices (e.g., output interfaces 1242, peripheral interfaces 1244, and communication devices 1246) to basic configuration 1202 via bus/interface controller 1230. Example output interfaces 1242 include a graphics processing unit 1248 and an audio processing unit 1250, which may be configured to communicate to various external devices such as a display or speakers via one or more A/V ports 1252. Example peripheral interfaces 1244 include a serial interface controller 1254 or a parallel interface controller 1256, which may be configured to communicate with external devices such as input devices (e.g., keyboard, mouse, pen, voice input device, touch input device, etc.) or other peripheral devices (e.g., printer, scanner, etc.) via one or more I/O ports 1258. An example communication device 1246 includes a network controller 1260, which may be arranged to facilitate communications with one or more other computing devices 1262 over a network communication link via one or more communication ports 1264.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 1200 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 1200 may also be implemented as a personal computer including both laptop computer and non-laptop computer configurations.

Actions, functions, or methods with respect to receiver 120 may include: receiving, from a server, a system parameter; selecting a secret decryption key corresponding to the receiver; generating a public encryption key for the receiver, based at least in part on the secret decryption key corresponding to the receiver and the system parameter; receiving, from a transmitter, a first ciphertext; receiving, from the server, a public encryption key corresponding to the transmitter; and deciphering the first ciphertext based at least in part on the secret decryption key of the receiver, the system parameter and the public encryption key corresponding to the transmitter, wherein the selecting the secret decryption key of the receiver includes selecting the secret decryption key corresponding to the receiver such that an inverse of the secret decryption key exists.

According to such method, at least one of the secret decryption key corresponding to the receiver, the system parameter, the first ciphertext and the public encryption key corresponding to the transmitter may be represented at least in part in a non-associative octonion ring. Further, the system parameter may include at least one of a prime number q greater than 2, or an element $B=(b_0, \ldots, b_7)$ in an octonion ring over a finite field such that $|B|^2 = 0 \mod q$, $B \neq 0 \mod q$ and $b_0 \neq 0 \mod q$. Such method may further include transmitting, to the server, the public encryption key corresponding to the receiver such that the server publishes the public encryption key corresponding to the receiver.

Actions, functions, or methods with respect to processor 1204 may include: receiving, from a transmitter, a request to process a message; receiving, from a server, a system parameter and a first ciphertext that corresponds to the message, based at least in part on the received request; processing the first ciphertext to a second ciphertext by calculating the first ciphertext, based at least in part on the received request, without deciphering the first ciphertext; and transmitting, to the transmitter, the second ciphertext.

According to such method, the message may be enciphered to the first ciphertext by the transmitter, based at least in part on a public encryption key and a secret decryption key corresponding to the transmitter.

Actions, functions, or methods with respect to endorser 520 may include: receiving, from a server, a signing parameter; selecting a secret key of the endorser; generating a public signing key of the endorser, based at least in part on the secret key corresponding to the endorser and the signing parameter; calculating a signature corresponding to a message, based at least in part on the public signing key corresponding to the endorser and the signing parameter; and transmitting, to the server, the signature and the public signing key.

According to such method, the signing parameter may include at least one of a prime number q greater than 2, or an element $B=(b_0, \ldots, b_7)$ in an octonion ring over a finite field such that $|B|^2=0$ mod q, $B \neq 0$ mod q and $b_0 \neq 0$ mod q, or an element C in the octonion ring such that $C=1-B$ mod q. The method of may further include transmitting, to an authenticator, a request to evaluate the signature, the signature being evaluated to be converted to a derived signature by the authenticator, based at least in part on the request. The method may still further include: receiving, from the authenticator, the derived signature; receiving, from the server, the public signing key; and verifying the derived signature based at least in part on the public signing key, the verifying of the derived signature indicating whether the authenticator correctly evaluates the signature. Further still, the signature, the secret key and the public signing key of the endorser may be represented at least in part in a non-associative octonion ring.

Receiver 120 may include a receiving unit configured to: receive, from a server, a system parameter and a public encryption key corresponding to a transmitter, and receive, from a transmitter, a first ciphertext. Receiver 120 may also include a key manager to select a secret decryption key of the receiver and to generate a public encryption key for the receiver, based at least in part on the secret decryption key of the receiver and the system parameter. Receiver 120 may still further include a decipherer to decipher the first ciphertext based at least in part on the secret decryption key of the receiver, the system parameter and the public encryption key corresponding to the transmitter.

Receiver 120 may transmit, to the server, the public encryption key of the sender such that the server publishes the public encryption key corresponding to the receiver. Further, the system parameter may include at least one of a prime number q greater than 2, or an element $B=(b_0, \ldots, b_7)$ in an octonion ring over a finite field such that $|B|^2=0$ mod q, $B \neq 0$ mod q and $b_0 \neq 0$ mod q.

Processor 1204 may include a receiving unit to receive, from a transmitter, a request to process a message, and to receive, from a server, a system parameter and a first ciphertext that corresponds to the message, based at least in part on the received request. Also included may be one or more processors to process the first ciphertext into a second ciphertext by calculating the first ciphertext, based at least in part on the received request, without deciphering the first ciphertext; and a transmitting unit to transmit, to the transmitter, the second ciphertext. The message may be enciphered to the first ciphertext by the transmitting unit, based at least in part on a public encryption key and a secret decryption key corresponding to the transmitter.

Endorser 520 may include: a receiving unit to receive, from a server, a signing parameter; a key manager to select a secret key corresponding to the endorser, and to generate a public signing key for the endorser, based at least in part on the secret key corresponding to the endorser and the signing parameter; a signature generator to calculate a signature corresponding to a message, based at least in part on the public signing key corresponding to the endorser and the signing parameter; and a transmitting unit to transmit, to the server, the signature and the public signing key.

With regard to endorser 520, the signing parameter may include at least one of a prime number q greater than 2, or an element $B=(b_0, \ldots, b_7)$ in an octonion ring over a finite field such that $|B|^2=0$ mod q, $B \neq 0$ mod q and $b_0 \neq 0$ mod q, or an element C in the octonion ring such that $C=1-B$ mod q; the transmitting unit may further transmit, to an authenticator, a request to evaluate the signature, the authenticator may evaluate the signature to be converted to a derived signature based at least in part on the request, and the receiving unit may further receive, from the authenticator, the derived signature and receive, from the server, the public signing key. The endorser may further include a verifier to verify the derived signature based at least in part on the public signing key to determine whether the authenticator correctly evaluates the signature.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A method performed under control of a transmitter of a computing device, the method comprising:
   receiving, from a server, a system parameter at the computing device;
   selecting, by the computing device, a secret decryption key corresponding to the transmitter;
   generating a first public encryption key for the transmitter, based at least in part on the secret decryption key corresponding to the transmitter and the system parameter received from the server;
      receiving, from the server, a public encryption key corresponding to a receiver of a data processing device, wherein the data processing device is different from the computing device;
      enciphering, by the computing device, a message into a first ciphertext, based at least in part on the public encryption key corresponding to the receiver of the data processing device and the secret decryption key corresponding to the transmitter;
      transmitting, from the computing device to the data processing device, a request to process the message by processing, at the data processing device, the first ciphertext that corresponds to the message into a second ciphertext without deciphering the first ciphertext; and
      deciphering, by the computing device, the second ciphertext received from the data processing device upon completion of the message process request, based on at least the system parameter, the first public encryption key, and the secret decryption key corresponding to the transmitter of the computing device.

2. The method of claim 1, wherein at least one of: the system parameter, the secret decryption key corresponding to the transmitter, the public encryption key corresponding to the receiver, the message, and the first ciphertext are represented at least in part in a non-associative octonion ring.

3. The method of claim 1, wherein the system parameter includes at least one of a prime number q greater than 2, or an element $B=(b_0, \ldots, b_7)$ in an octonion ring over a finite field such that $|B|^2=0$ mod q, $B \neq 0$ mod q, and $b_0 \neq 0$ mod q.

4. The method of claim 1, further comprising:
   transmitting, from the computing device to the server, the first public encryption key for the transmitter such that the server publishes the first public encryption key for the transmitter.

5. The method of claim 1, further comprising:
   selecting, by the computing device, a temporary secret decryption key corresponding to the transmitter;
   generating, by the computing device, a temporary public encryption key of the transmitter, based at least in part on the temporary secret decryption key corresponding to the transmitter and the system parameter; and
   generating, by the computing device, a second public encryption key for the transmitter, based at least in part on the first public encryption key, the temporary secret decryption key corresponding to the transmitter, and the system parameter,
   wherein the enciphering is further based on the temporary secret decryption key corresponding to the transmitter.

6. The method of claim 5, further comprising:
   receiving, from the data processing device, the second ciphertext at the computing device; and
   deciphering, by the computing device, the second ciphertext, based at least in part on the system parameter, the first public encryption key, and the temporary secret decryption key corresponding to the transmitter,
   wherein the deciphering the second ciphertext includes obtaining the processed message.

7. The method of claim 1, further comprising:
generating, by the computing device, a public encryption key for the transmitter and for the receiver, based at least in part on the public encryption key corresponding to the receiver, the secret decryption key corresponding to the transmitter, and the system parameter; and
transmitting, to the server, the first ciphertext,
wherein the enciphering is further based on the secret decryption key corresponding to the transmitter.

8. A transmitter of a computing device, the transmitter comprising:
a receiving unit of the computing device configured to receive, from a server, a system parameter and a public encryption key corresponding to a receiver of a data processing device, wherein the data processing device is different from the computing device;
a key manager of the computing device configured to select a secret decryption key of the transmitter and to generate a first public encryption key for the transmitter, based at least in part on the secret decryption key corresponding to the transmitter and the system parameter received from the server;
an encipherer of the computing device configured to encipher a message into a first ciphertext, based at least in part on the public encryption key corresponding to the receiver of the data processing device and the secret decryption key corresponding to the transmitter;
a transmitting unit of the computing device configured to transmit, to the data processing device, a request to process the message by processing, at the data processing device, the first ciphertext that corresponds to the message into a second ciphertext without deciphering the first ciphertext; and
a deciphering unit, of the computing device, configured to decipher the second ciphertext received from the data processing device upon completion of the message process request, based on at least the system parameter, the first public encryption key, and the secret decryption key corresponding to the transmitter of the computing device.

9. The transmitter of claim 8, wherein the transmitting unit is further configured to transmit, to the server, the first public encryption key for the transmitter such that the server publishes the first public encryption key for the transmitter.

10. The transmitter of claim 8, wherein the system parameter includes at least one of a prime number q greater than 2, or an element $B=(b_0, \ldots, b_7)$ in an octonion ring over a finite field such that $|B|^2=0$ mod q, $B \neq 0$ mod q, and $b_0 \neq 0$ mod q.

11. The transmitter of claim 8, wherein the key manager is further configured to:
select a temporary secret decryption key for the transmitter;
generate a temporary public encryption key for the transmitter, based at least in part on the temporary secret decryption key corresponding to the transmitter and the system parameter; and
generate a second public encryption key for the transmitter, based at least in part on the first public encryption key, the temporary secret decryption key corresponding to the transmitter, and the system parameter,
wherein the encipherer is configured to encipher the message into the first ciphertext further based on the temporary secret decryption key corresponding to the transmitter.

12. The transmitter of claim 11, wherein the receiving unit is further configured to receive, from the data processing device, the second ciphertext,
wherein the transmitter further comprises a decipherer configured to decipher the second ciphertext, based at least in part on the system parameter, the first public encryption key, and the temporary secret decryption key corresponding to the transmitter, and
wherein the deciphering of the second ciphertext includes obtaining the processed message.

13. The transmitter of claim 8, wherein the key manager is further configured to generate a public encryption key for the transmitter and a receiver, based at least in part on the public encryption key corresponding to the receiver, the secret decryption key corresponding to the transmitter, and the system parameter,
wherein the encipherer is configured to encipher the message into the first ciphertext, based at least in part on the public encryption key corresponding to the receiver and the secret decryption key corresponding to the transmitter, and
wherein the transmitting unit is configured to transmit, to the server, the first ciphertext.

14. A non-transitory computer-readable medium having computer-executable instructions stored thereon that, when executed, cause one or more hardware processors to:
receive, from a server, a system parameter at a computing device;
select a secret decryption key corresponding to a transmitter of the computing device;
generate a first public encryption key for the transmitter, based at least in part on the secret decryption key corresponding to the transmitter and the system parameter received from the server;
receive, from the server, a public encryption key corresponding to a receiver of a data processing device, wherein the data processing device is different from the computing device;
encipher a message into a first ciphertext, based at least in part on the public encryption key corresponding to the receiver of the data processing device and the secret decryption key corresponding to the transmitter;
transmit, from the computing device to the data processing device, a request to process the message by processing, at the data processing device, the first ciphertext that corresponds to the message into a second ciphertext without deciphering the first ciphertext; and
decipher, by the computing device, the second ciphertext received from the data processing device upon completion of the message process request, based on at least the system parameter, the first public encryption key, and the secret decryption key corresponding to the transmitter of the computing device.

15. The computer-readable medium of claim 14, wherein at least one of the system parameter, the secret decryption key corresponding to the transmitter, the public encryption key corresponding to the receiver, the message, and the first ciphertext are represented at least in part in a non-associative octonion ring.

16. The computer-readable medium of claim 14, wherein the system parameter includes at least one of a prime number q greater than 2, or an element $B=(b_0, \ldots, b_7)$ in an octonion ring over a finite field such that $|B|^2=0$ mod q, $B \neq 0$ mod q, and $b_0 \neq 0$ mod q.

17. The computer-readable medium of claim 14, further comprising instructions that cause the one or more hardware processors to further:

transmit, from the computing device to the server, the first public encryption key for the transmitter such that the server publishes the first public encryption key for the transmitter.

18. The computer-readable medium of claim 14, further comprising instructions that cause the one or more hardware processors to further:
   select a temporary secret decryption key corresponding to the transmitter;
   generate a temporary public encryption key of the transmitter, based at least in part on the temporary secret decryption key corresponding to the transmitter and the system parameter; and
   generate a second public encryption key for the transmitter, based at least in part on the first public encryption key, the temporary secret decryption key corresponding to the transmitter, and the system parameter,
   wherein the message is enciphered into the first ciphertext based, further, on the temporary secret decryption key corresponding to the transmitter.

19. The computer-readable medium of claim 18, further comprising instructions that cause the one or more hardware processors to further:
   receive, from the data processing device, the second ciphertext; and
   decipher the second ciphertext, based at least in part on the system parameter, the first public encryption key, and the temporary secret decryption key corresponding to the transmitter, wherein the second ciphertext is deciphered by obtaining the processed message.

20. The computer-readable medium of claim 14, further comprising instructions that cause the one or more hardware processors to further:
   generate a public encryption key for the transmitter and for the receiver, based at least in part on the public encryption key corresponding to the receiver, the secret decryption key corresponding to the transmitter, and the system parameter; and
   transmit, to the server, the first ciphertext,
   wherein the message is enciphered into the first ciphertext based, further, on the secret decryption key corresponding to the transmitter.

* * * * *

UNITED STATES PATENT AND TRADEMARK OFFICE
CERTIFICATE OF CORRECTION

PATENT NO.         : 9,876,636 B2
APPLICATION NO.    : 14/990028
DATED              : January 23, 2018
INVENTOR(S)        : Yagisawa It is certified that error appears in the above-identified patent and that said Letters Patent is hereby corrected as shown below:

In the Drawings

In Fig. 9, Sheet 9 of 12, for Tag "930", Line 1, delete "PROCESSE THE" and insert -- PROCESS THE --, therefor.

In the Specification

In Column 6, Line 11, delete "manner" and insert -- manner. --, therefor.

In Column 8, Line 38, delete "GaussElimi(pk$_z$,O)" and insert -- GaussElimi(pk$_z$,D) --, therefor.

In Column 12, Line 23, delete "an decipherer" and insert -- a decipherer --, therefor.

In Column 13, Line 35, delete "network." and insert -- network 540. --, therefor.

In Column 15, Line 46, after Formula 11, delete "," and insert -- . --, therefor.

In Column 19, Lines 56-57, delete "server 150," and insert -- server 130, --, therefor.

In Column 20, Line 13, delete "Program product 1100" and insert -- Computer program product 1100 --, therefor.

In Column 20, Line 39, delete "hard disk drive, a CD, a DVD," and insert -- hard disk drive (HDD), a compact disk (CD), a digital versatile disk (DVD), --, therefor.

In Column 20, Line 47, delete "communications link," and insert -- communication link, --, therefor.

In Column 20, Line 48, delete "program product 1100" and insert -- computer program product 1100 --, therefor.

Signed and Sealed this
Twenty-sixth Day of June, 2018

Andrei Iancu
*Director of the United States Patent and Trademark Office*

In Column 20, Line 51, delete "signal bearing medium 1120," and insert -- signal bearing medium 1110, --, therefor.

In Column 20, Lines 51-52, delete "signal bearing medium 1120" and insert -- signal bearing medium 1110 --, therefor.

In Column 21, Line 2, delete "one more" and insert -- one or more --, therefor.

In Column 21, Line 9, delete "implementations memory" and insert -- implementations, memory --, therefor.

In Column 24, Line 60, delete "recitation no" and insert -- recitation, no --, therefor.

In Column 25, Line 15, delete "general such" and insert -- general, such --, therefor.

In Column 25, Line 22, delete "general such" and insert -- general, such --, therefor.